(12) United States Patent
Lee et al.

(10) Patent No.: US 9,261,994 B2
(45) Date of Patent: Feb. 16, 2016

(54) MOBILE TERMINAL

(71) Applicant: LG Electronics Inc., Seoul (KR)

(72) Inventors: Junghyun Lee, Seoul (KR); Jinhae Choi, Seoul (KR); Younghoon Lee, Seoul (KR); Jongseok Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/174,695

(22) Filed: Feb. 6, 2014

(65) Prior Publication Data

US 2015/0015500 A1 Jan. 15, 2015

(30) Foreign Application Priority Data

Jul. 10, 2013 (KR) ........................ 10-2013-0081264

(51) Int. Cl.
| | |
|---|---|
| *G06F 3/041* | (2006.01) |
| *G06F 3/0481* | (2013.01) |
| *G06F 3/0482* | (2013.01) |
| *G06F 3/01* | (2006.01) |
| *G06F 3/023* | (2006.01) |
| *G06F 3/044* | (2006.01) |
| *G06F 3/0488* | (2013.01) |

(52) U.S. Cl.
CPC ............... *G06F 3/041* (2013.01); *G06F 3/016* (2013.01); *G06F 3/0238* (2013.01); *G06F 3/044* (2013.01); *G06F 3/0481* (2013.01); *G06F 3/0482* (2013.01); *G06F 3/04886* (2013.01); *G06F 2203/013* (2013.01); *G06F 2203/04105* (2013.01)

(58) Field of Classification Search
CPC ............ G06F 3/04883; G06F 3/04817; G06F 2203/013; G06F 2203/04105; G06F 3/016; G06F 3/0238; G06F 3/041; G06F 3/044; G06F 3/0481; G06F 3/0482; G06F 3/04886
USPC .......................................... 715/810–845, 864
See application file for complete search history.

(56) References Cited

U.S. PATENT DOCUMENTS

| | | | |
|---|---|---|---|
| 8,769,431 B1 * | 7/2014 | Prasad | ........................ 715/788 |
| 2008/0158189 A1 | 7/2008 | Kim | |
| 2010/0137031 A1 | 6/2010 | Griffin et al. | |
| 2010/0138765 A1 * | 6/2010 | Rainisto | ........................ 715/766 |
| 2015/0067602 A1 * | 3/2015 | Bernstein et al. | ............. 715/823 |

FOREIGN PATENT DOCUMENTS

EP 2144150 1/2010

OTHER PUBLICATIONS

"AOKP Detailed Walk-Through," XP054975590, Apr. 2012, 1 page.
(Continued)

*Primary Examiner* — Kumar Patel
*Assistant Examiner* — Insa Sadio
(74) *Attorney, Agent, or Firm* — Lee, Hong, Degerman, Kang & Waimey

(57) ABSTRACT

A mobile terminal is disclosed, thereby implementing a user input of a new type and enabling a user to determine a type and arrangement of a displayed navigation button on user's own. The present invention includes a display unit having a prescribed region assigned as a navigation region; and a controller controlling at least one navigation button to be displayed through the navigation region, wherein a type and arrangement of the at least one navigation button displayable through the navigation region are changeable.

24 Claims, 32 Drawing Sheets

(56) References Cited

OTHER PUBLICATIONS

Pandey, "CyanogenMod 10.1 vs. AOKP Feature Comparison," XP055149847, May 2013, 8 pages.
Wilson, "AOKP Custom Nav Buttons-Beta 2," XP054975588, Apr. 2012, 1 page.
Rehman, "1Tap Quick Bar Brings Extensive Personalization to Your Android's Notification Panel," Jul. 2012, XP055151019, 4 pages.
Ruddock, "Editorial: The Android 4.2 Tablet UI Looks Just Like a Giant Phone's, and That's Fantastic," Oct. 2012, XP055150205, 6 pages.
European Patent Office Application Serial No. 14168201.3, Search Report dated Nov. 19, 2014, 12 pages.

* cited by examiner (a)  (b)

(a)                  (b)

(a)  (b)

FIG. 17
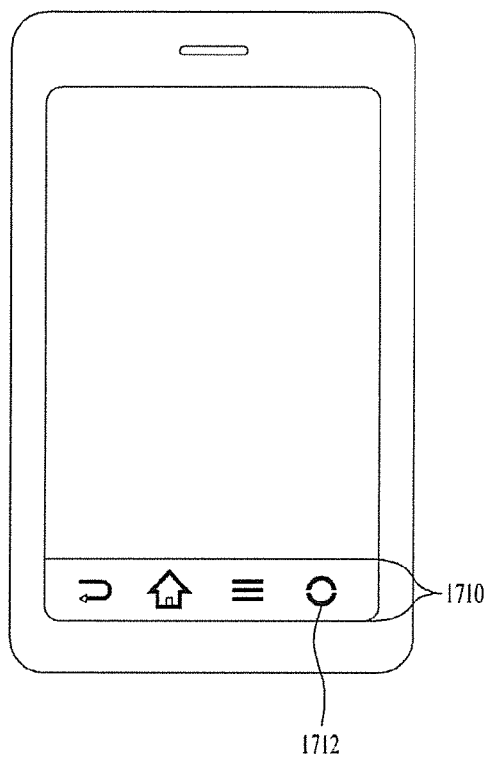
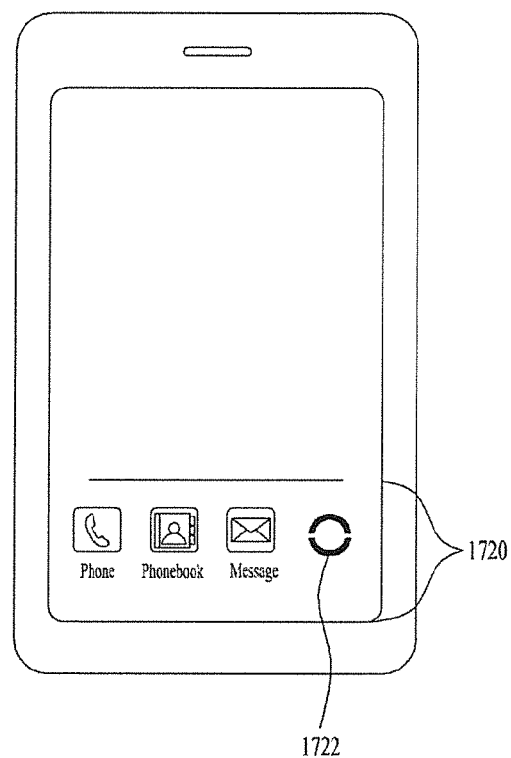
(a)  (b)

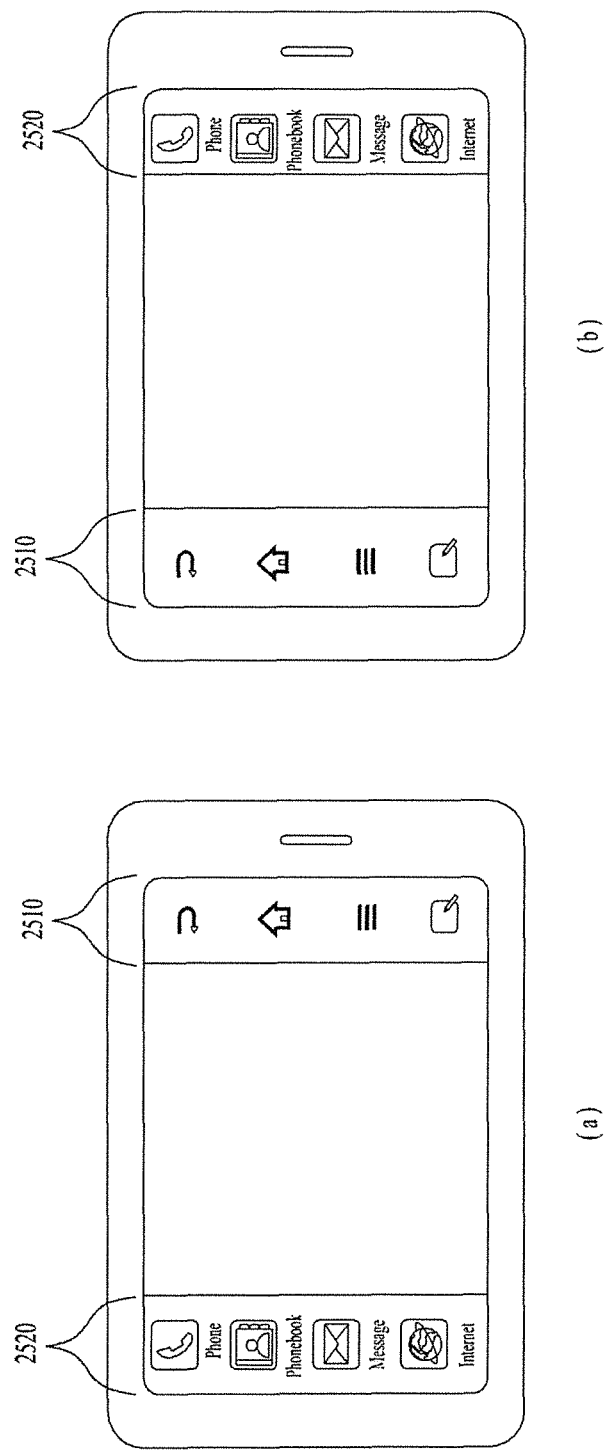

MOBILE TERMINAL

CROSS-REFERENCE TO RELATED APPLICATIONS

Pursuant to 35 U.S.C. §119(a), this application claims the benefit of earlier filing date and right of priority to Korean Application No. 10-2013-0081264, filed on Jul. 10, 2013, the contents of which are hereby incorporated by reference herein in their entirety.

BACKGROUND OF THE INVENTION

1. Field of the Invention

The present invention relates to a mobile terminal. Although the present invention is suitable for a wide scope of applications, it is particularly suitable for selectively combining a type and arrangement of a navigation button implemented by software.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

A mobile terminal according to a related art adopts a physical key pad (e.g., a numeral keypad) to receive a user input. Yet, as a touchscreen is generally used, the utility of the physical keypad is considerably reduced. Nonetheless, a number of mobile terminals currently adopt the physically implemented navigation buttons (e.g., a home button of Android OS loaded mobile terminal, a home button of iOS loaded mobile terminal, etc.). In order to arrange a navigation button, a space for arranging a navigation button should be sufficiently secured on a front side of a mobile terminal. However, such a restriction put on the space is not suitable for implementing a bezeless mobile terminal. So, a method of implementing a navigation button by software to replace a physical navigation button is currently discussed.

SUMMARY OF THE INVENTION

Accordingly, the present invention is directed to a mobile terminal that substantially obviates one or more problems due to limitations and disadvantages of the related art.

One object of the present invention is to provide a mobile terminal, by which a user input of a new type different from that of a related art can be implemented.

Another object of the present invention is to provide a mobile terminal, by which a user is enabled to determine a type and arrangement of a displayed navigation button on user's own.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to one embodiment of the present invention includes a display unit having a prescribed region assigned as a navigation region; and a controller controlling at least one navigation button to be displayed through the navigation region, wherein a type and arrangement of the at least one navigation button displayable through the navigation region are changeable.

In another aspect of the present invention, a mobile terminal according to another embodiment of the present invention includes a display unit having at least one portion assigned as a display region for displaying at least one navigation button and at least one dock icon and a controller controlling either the at least one navigation button or the at least one dock icon to be selectively displayed through the display region, the controller controlling both of the at least one navigation button and the at least one dock icon to be simultaneously displayed through the display region.

Effects obtainable from the present invention are non-limited the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 17 is a diagram to describe one example of displaying a dock region or a navigation region selectively;

FIG. 24 and FIG. 25 are diagrams of examples of outputs to a display unit set in landscape mode, respectively.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of mobile terminals. Examples of such terminals include mobile phones, user equipments, smart phones, digital broadcast receivers, personal digital assistants, laptop computers, portable multimedia players (PMP), navigators and the like.

Yet, it is apparent to those skilled in the art that a configuration according to an embodiment disclosed in this specification is applicable to such a fixed terminal as a digital TV, a desktop computer and the like as well as a mobile terminal.

Figure 1:
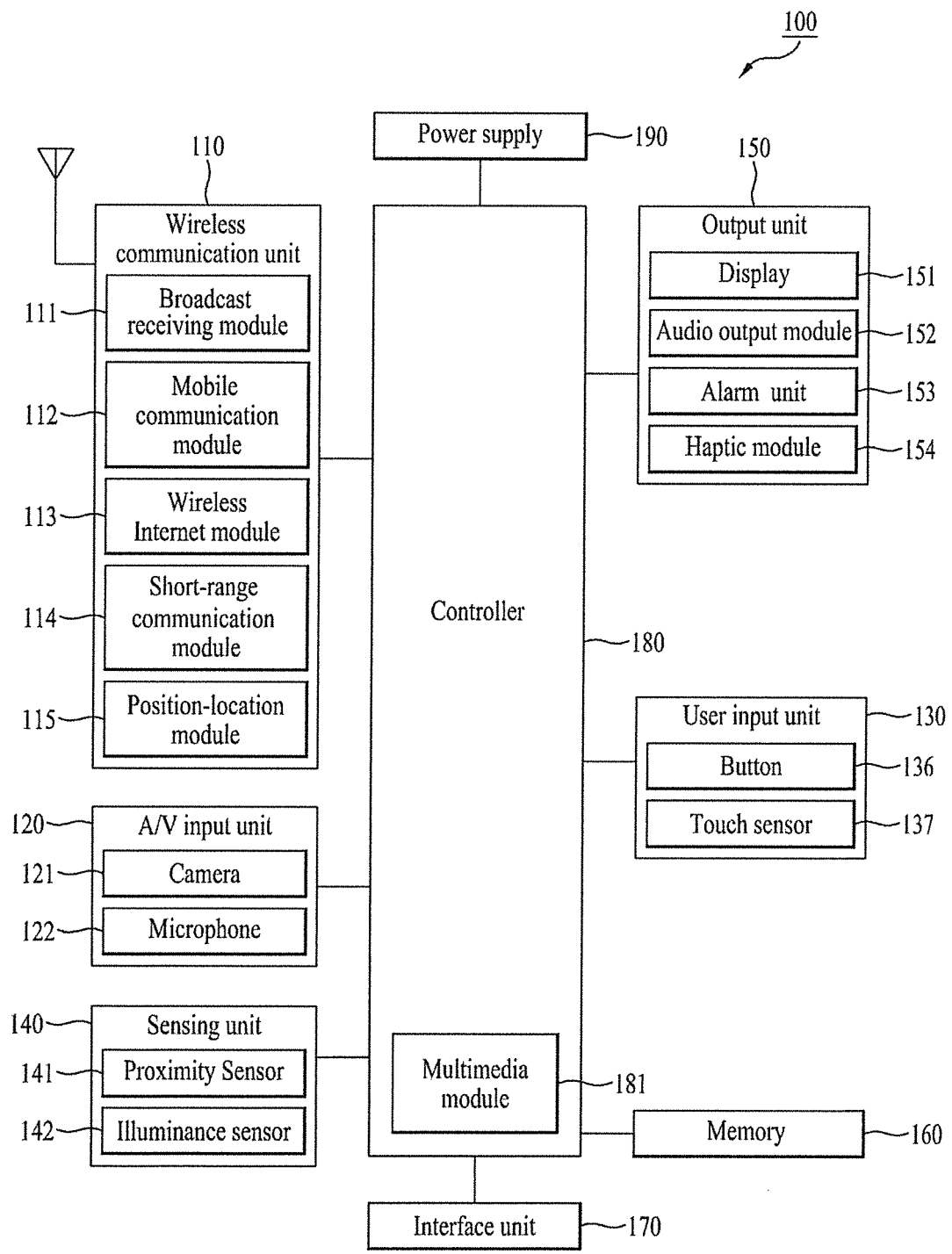
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided to the mobile terminal 100 in pursuit of simultaneous receptions of at least two broadcast channels or broadcast channel switching facilitation.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), Convergence of Broadcasting and Mobile Service (DVB-CBMS), Open Mobile Alliance-BroadCAST (OMA-BCAST), China Multimedia Mobile Broadcasting (CMMB), Mobile Broadcasting Business Management System (MBBMS), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module. According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a button 136 provided to front/rear/lateral side of the mobile terminal 100 and a touch sensor (constant pressure/electrostatic) 137 and may further include a key pad, a dome switch, a jog wheel, a jog switch and the like [not shown in the drawing].

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. By nonlimiting example, such sensing unit 140 include, gyro sensor, accelerate sensor, geomagnetic sensor.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and the touch sensor 137 configures a mutual layer structure (hereinafter called 'touch screen'), it is able to use the display 151 as an input device as well as an output device. In this case, the touch sensor can be configured as a touch film, a touch sheet, a touchpad or the like.

The touch sensor 137 can be configured to convert a pressure applied to a specific portion of the display 151 or a variation of a capacitance generated from a specific portion of the display 151 to an electric input signal. Moreover, it is able to configure the touch sensor 137 to detect a pressure of a touch as well as a touched position or size.

If a touch input is made to the touch sensor 137, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

A proximity sensor (141) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of the following description, as a pointer becomes proximate to a touchscreen without coming into contact with the touchscreen, if the pointer is perceived as situated over the touchscreen, such an action shall be named 'proximity touch'. If a pointer actually comes into contact with a touchscreen, such an action shall be named 'contact touch'. A proximity-touched position over the touchscreen with the pointer may mean a position at which the pointer vertically opposes the touchscreen when the touchscreen is proximity-touched with the pointer.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

A battery may include a built-in rechargeable battery and may be detachably attached to the terminal body for a charging and the like. A connecting port may be configured as one example of the interface 170 via which an external charger for supplying a power of a battery charging is electrically connected.

Various embodiments described herein may be implemented in a computer-readable medium using, for example, computer software, hardware, or some combination thereof.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
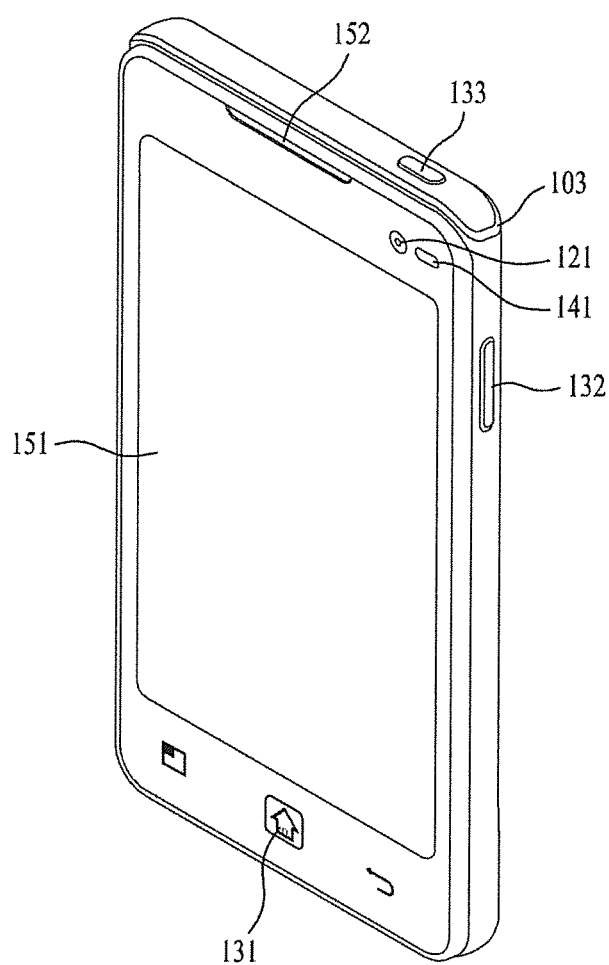
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (101, 102, 103) configuring an exterior thereof. In the present embodiment, the case can be divided into a front case 101 and a rear case 102. Various electric/electronic parts are loaded in a space provided between the front and rear cases 101 and 102.

Occasionally, electronic components can be mounted on a surface of the rear case 102. The electronic part mounted on the surface of the rear case 102 may include such a detachable part as a battery, a USIM card, a memory card and the like. In doing so, the rear case 102 may further include a backside cover 103 configured to cover the surface of the rear case 102. In particular, the backside cover 103 has a detachable configuration for user's convenience. If the backside cover 103 is detached from the rear case 102, the surface of the rear case 102 is exposed.

Referring to FIG. 2, if the backside cover 103 is attached to the rear case 102, a lateral side of the rear case 102 may be exposed in part. If a size of the backside cover 103 is decreased, a rear side of the rear case 102 may be exposed in part. If the backside cover 103 covers the whole rear side of the rear case 102, it may include an opening 103' configured to expose a camera 121' or an audio output unit 152' externally.

The cases 101, 102 and 103 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the case 101 or 102.

The display 151 occupies most of a main face of the front case 101. The audio output unit 152 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152 and the like can be inputted to the second manipulating unit 132, a command for a switching to a touch recognizing mode of the display 151 and the like can be inputted to the second manipulating unit 133.

Figure 3:
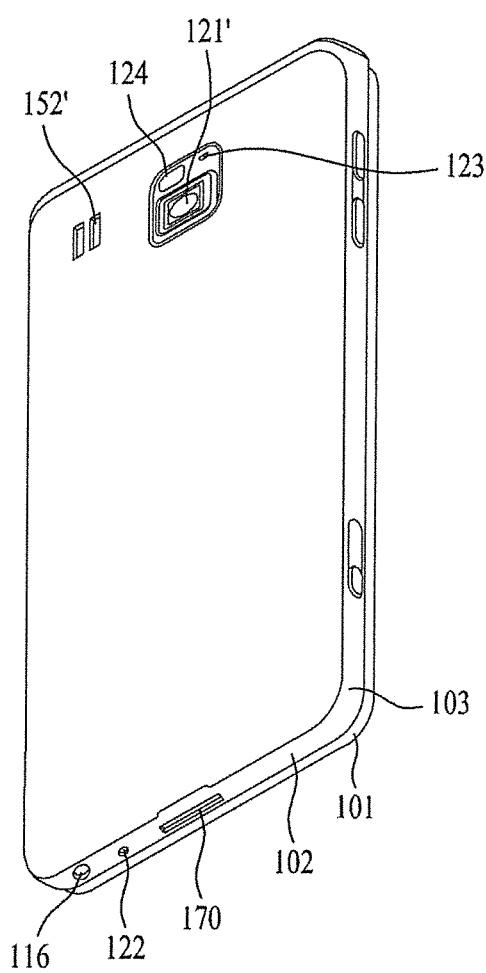
FIG. 3 is a rear perspective diagram of a mobile terminal according to one embodiment of the present invention.

FIG. 3 is a perspective diagram of a backside of the terminal shown in FIG. 2.

Referring to FIG. 3, a camera 121' can be additionally provided to a backside of the terminal body, and more particularly, to the rear case 102. The camera 121 has a photographing direction that is substantially opposite to that of the former camera 121 shown in FIG. 2 and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 116 constructing a portion of the broadcast receiving module 111 shown in FIG. 1 can be retractably provided to the terminal body.

In order to enhance manipulation convenience of a mobile terminal, a navigation button is generally provided to the mobile terminal. Regarding mobile operating systems, the Android OS (operating system) installed mobile terminal generally includes a cancel button, a home button, a menu button and the like as navigation buttons, while the iOS installed mobile terminal generally includes a home button as a navigation button. In particular, the cancel button can be used to end each active application or cancel an inputted user command. And, the menu button can be used to page an appropriate menu associated with a currently outputted screen. The home button, which is common to the Android OS and the iOS, can be used for cancellation of a power saving mode of a mobile terminal, a shift to a home screen, an inter job shift in a multi-tasking environment and the like.

According to a related art, a navigation button normally has a configuration of a physical key type. Recently, in order to cope with the generalization of bezeless design and the trend toward an increasing display size, a method of configuring a navigation button of a soft key type defined by software is currently taken into consideration.

Figure 4:
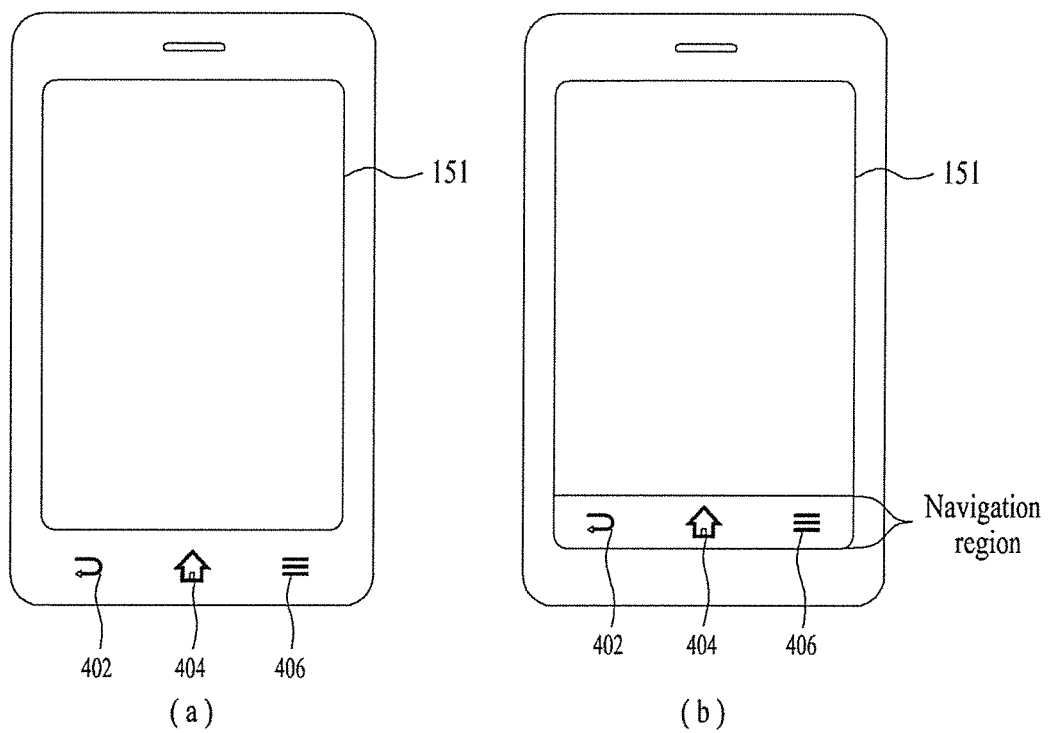
FIG. 4 is a diagram for one example of a navigation button of a physical key type and a navigation button of a soft key type.

FIG. 4 is a diagram for one example of a navigation button of a physical key type and a navigation button of a soft key type. In particular, FIG. 4 (*a*) is a diagram for one example that navigations buttons including a cancel button, a home button and a menu button are implemented as a physical key type, while FIG. 4 (*b*) is a diagram for one example that navigations buttons including a cancel button, a home button and a menu button are implemented as a soft key type. In case that a navigation button is implemented by software, as shown in FIG. 4 (*b*), the corresponding navigation button can be outputted through a display unit.

In case that a navigation button is physically implemented, a physical space for arranging the navigation button should be provided. Yet, in case that a navigation button is implemented by software, it is not necessary to provide a separate physical space for arranging the navigation button. Hence, implementing a navigation button by software can be more advantageous in applying a bezeless design than implementing a navigation button physically.

In the following description of the present invention, assume that a navigation button is implemented by software. And, assume that a display unit includes a touchscreen capable of receiving a touch input to the navigation button. Moreover, a spatial region for displaying the navigation button on the display unit shall be named a navigation region.

On the navigation region, at least one mandatory navigation button and an optionally additional navigation button can be displayed. For clarity of the following description with reference to the accompanying drawings, assume that a cancel button, a home button and a menu button are mandatory navigation buttons.

Arrangement and type of a navigation button displayed through a navigation region can be changed by user's settings. One example of changing an arrangement and type of a navigation button displayed through a navigation region according to an embodiment shall be described in detail with reference to FIG. 5 as follows.

Figure 5:
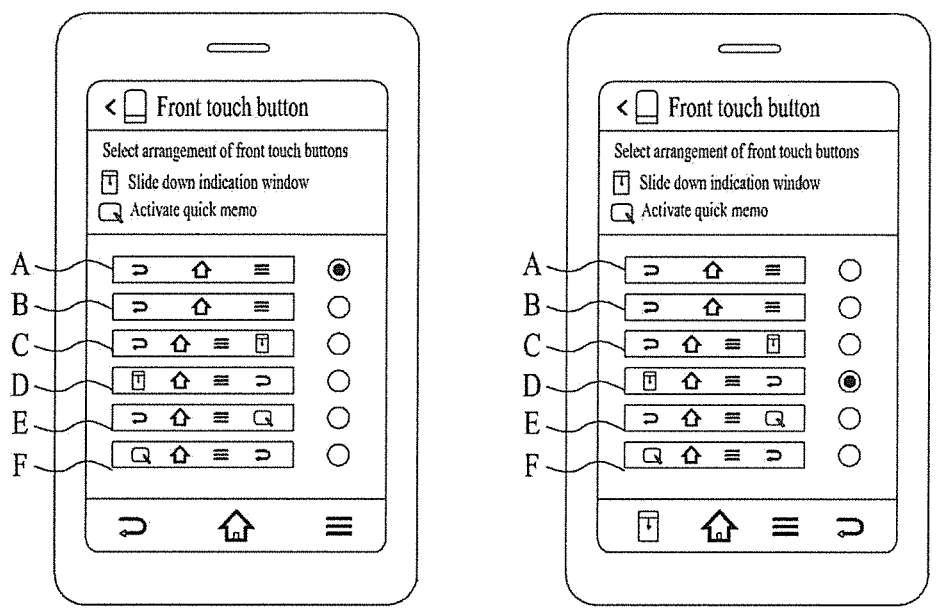
FIG. 5 is a diagram to describe one example of changing an arrangement and type of a navigation button within a navigation region.

FIG. 5 is a diagram to describe one example of changing an arrangement and type of a navigation button within a navigation region.

Referring to FIG. 5, a controller can control a selection menu, which is provided to select a combination from combination examples A to F of types and arrangements of navigation buttons displayable on a navigation region, to be displayed [FIG. 5 (*a*)]. In particular, as shown in the example of the selection menu shown in FIG. 5 (*a*), the controller can provide a combination example configured with mandatory navigation buttons and a combination example configured with mandatory buttons and an additional navigation button.

If a user selects a random combination example, the controller can determine a type and arrangement of a navigation button appearing on the navigation region depending on the combination example selected by the user. Referring to FIG. 5 (*a*), the navigation region is configured in accordance with an item A including the mandatory buttons only. Referring to FIG. 5 (*b*), the navigation region is configured in accordance with an item D including the mandatory buttons and the additional button.

Looking into the combination examples shown in FIG. 5 (*a*) and FIG. 5 (*b*), the combination example is configured with the mandatory navigation buttons (i.e., the combination example including total 3 navigation buttons, cf. Item A and Item B) or the mandatory navigation buttons and a single additional navigation button (i.e., the combination example including total 4 navigation buttons, cf. Items C to F). Besides, a combination example including the mandatory navigation buttons and a plurality of additional navigation buttons (e.g., a combination example including 5 navigation buttons) can be provided.

The combination examples shown in FIG. 5 (*a*) and FIG. 5 (*b*) can be manually changed by a user. For instance, if a user applies an appropriate touch input to one of the combination examples, the user can control the navigation buttons exposed in corresponding combination example to be changed or can control an arrangement sequence of the navigation buttons to be changed. For instance, based on a user's touch input, the controller can switch positions of cancel and home buttons in the item A to each other or can change an indication button in the item D into a button of a different type. In doing so, the change of the navigation button exposed in the combination example is applicable to the additional navigation button only.

Figure 6A:
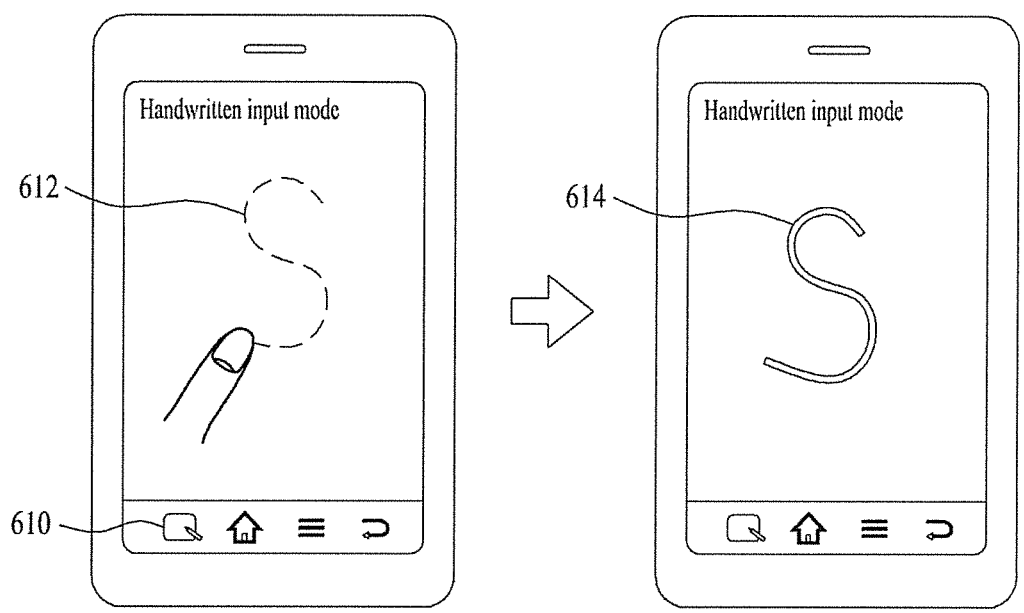
FIGS. 6A to 6G are diagrams for examples to describe an operation of an additional navigation button.

In the examples shown in FIG. 5 (*a*) and FIG. 5 (*b*), additional navigation buttons include a quick memo button and an indication button in addition to the mandatory navigation buttons including the cancel button, the home button, the menu button and the like. In particular, the quick memo button may be provided to enable the mobile terminal to enter a handwritten input mode in order for a user to input handwritings at any time. In the handwritten input mode, if the user inputs a touch of a prescribed trajectory 612, referring to FIG. 6A, a handwriting 614 can be drawn along the touch trajectory 612.

Figure 6B:
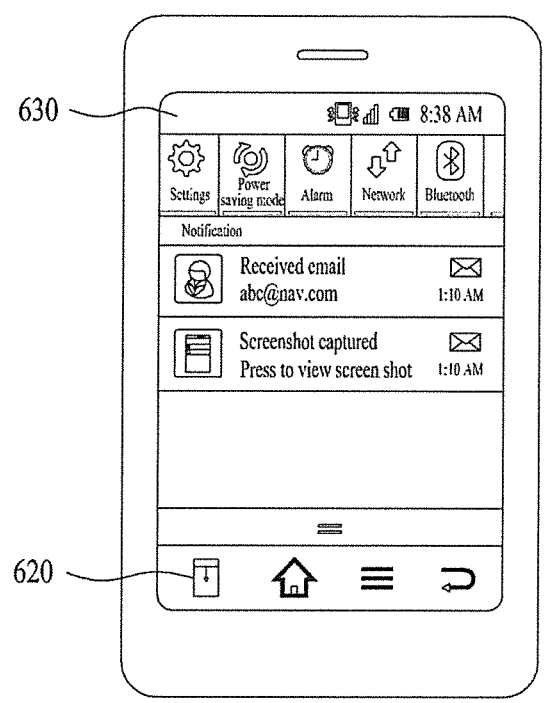

The indication button may be provided to display an indication window for providing information on an occurrence of an event (e.g., a text message newly received by a mobile terminal, a newly received email, an occurrence of an absent call, etc.). If the indication button 620 is touched, referring to FIG. 6B, the controller can control an indication window to be displayed in order to indicate an event occurrence. According to the related art, a state display line 630 indicating an operating state of a mobile terminal can be checked in a manner of being dragged in one direction. Yet, when the indication button is exposed in the navigation region, if the indication button is simply touched, the indication window for checking an indication of an event occurring in the mobile terminal can be displayed.

Figure 6C:
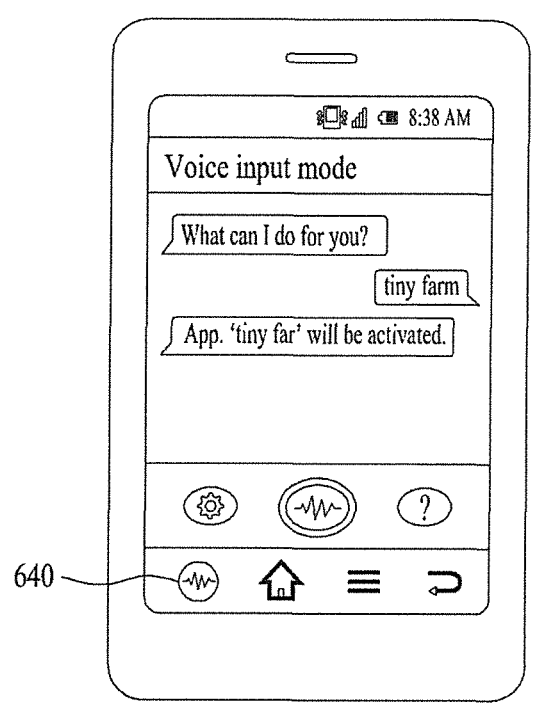

Besides the examples shown in FIG. 5 (*a*) and FIG. 5 (*b*), a quick voice button, a search button, a volume button, an integrated access button and the like can be configured as additional navigation buttons. The quick voice button may be configured to set a mode of a mobile terminal to a voice input mode in order for a user to manipulate the mobile terminal using a voice. If the quick voice button 640 is touched, referring to FIG. 6C, the controller can enter a state capable of receiving an input of user's voice, i.e., a voice input mode. The controller can appropriately control the mobile terminal based on the user's voice inputted via a microphone in the voice input mode.

Figure 6D:
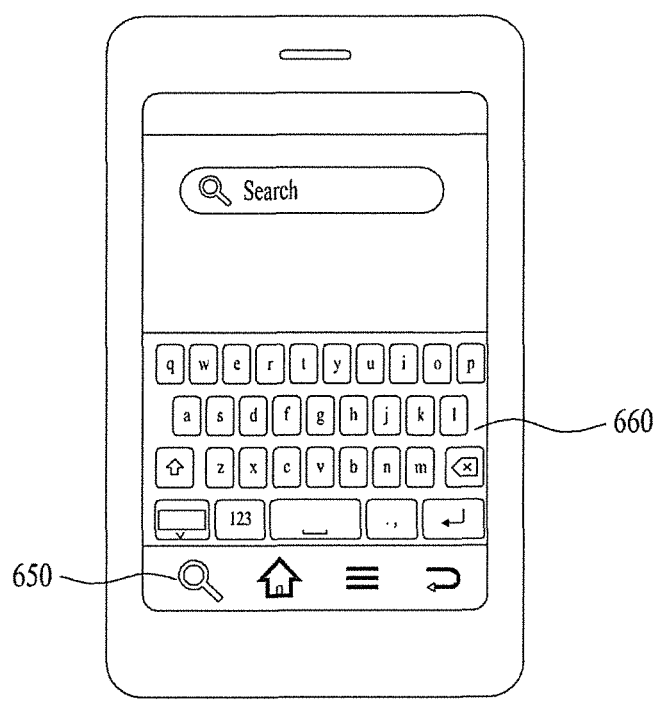

The search button may be provided to search a memory or web for data matching a text inputted by a user. If the search button 650 is touched, referring to FIG. 6D, the user can control a virtual keypad 660 to be displayed in order for a user to input a text. If a prescribed text is inputted via the virtual keypad, the controller extracts data matching the inputted text from the memory and then displays the extracted data. If a prescribed text is inputted via the virtual keypad, the controller can display a result of the search for the inputted text found from the web.

Figure 6E:
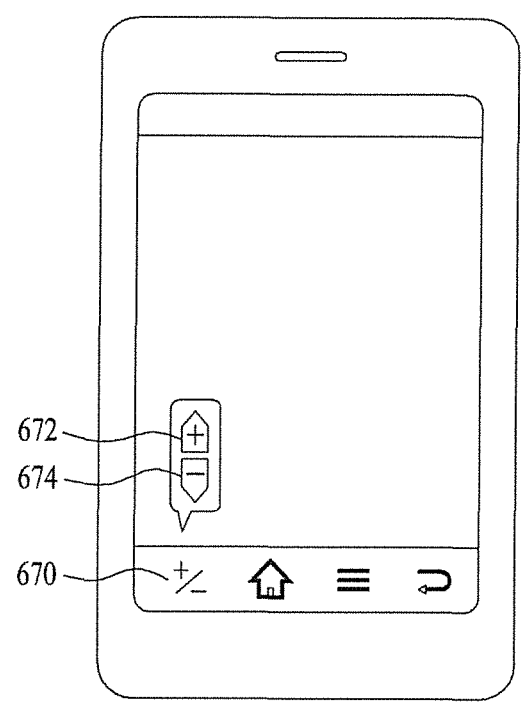

The volume button is provided to adjust a volume of the mobile terminal. If the volume button 670 is touched, referring to FIG. 6E, the controller can control a pair of volume adjust buttons (e.g., '+' button 672 and '−' button 674) to be displayed. In the example shown in FIG. 6E, if the '+' button 672 is touched, the volume of the mobile terminal can be raised. If the '−' button 674 is touched, the volume of the mobile terminal can be lowered.

The integrated access button is configured to provide one of a plurality of functions selectively. If the integrated access button is 680 touched, referring to FIG. 6F, the controller can control a plurality of buttons 682, 684 and 686, which are related to a plurality of functions linked to the integrated access button, respectively, to be displayed. If a prescribed button is selected from a plurality of the buttons 682, 684 and 686, the controller can selectively activate a prescribed one of a plurality of the functions linked to the integrated access button 680. In the example shown in FIG. 6F, if the integrated access button 680 is touched, a quick memo button 684, a quick voice button 682 and a search button 686 are displayed.

Figure 6F:
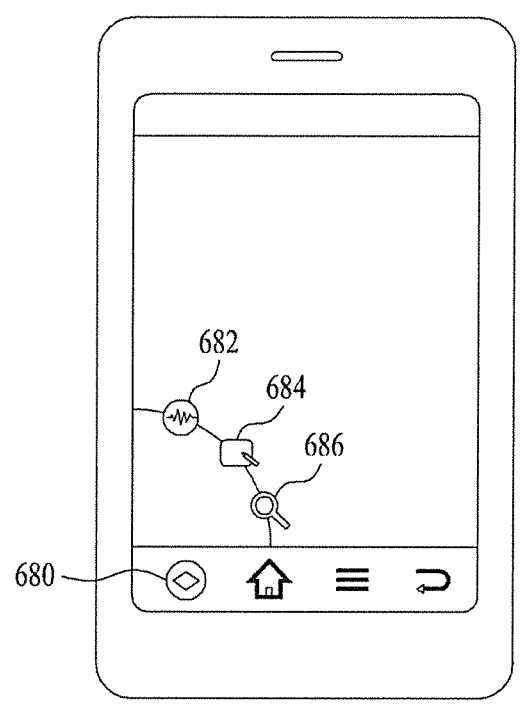

A type of a button, which is displayed if the integrated access button 680 is touched, can be set different from that shown in FIG. 6F or may be manually set by a user.

Figure 6G:
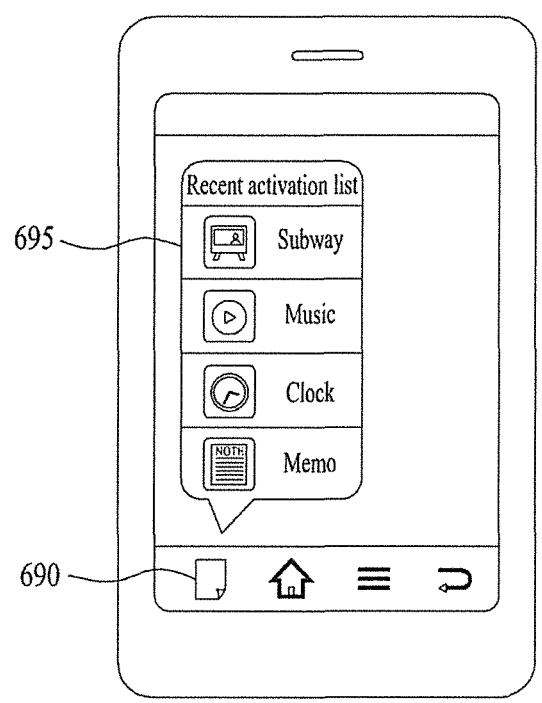

A recent button is configured to provide a list of recently activated applications. If the recent button 690 is touched, referring to FIG. 6G, the controller can control a recently activated application list 695 to be displayed. If a prescribed application is selected from the recently activated application list, the controller can activate the selected application.

Besides the examples shown in FIGS. 6A to 6F, various buttons can be configured as additional navigation buttons. For instance, an application button for activating a specific application may be configured as a navigation button. An application, which will be active if the application button is touched, may be manually selected by a user or may be automatically set to an application most frequently activated by a user. For another instance, if the application button is touched, the controller can control an application, which is most recently activated by a user, to be activated.

As the number of candidates configurable as additional navigation buttons in a candidate list increases, the number of the combination examples providable through the selection menu shown in FIG. 5 (*a*) and FIG. 5 (*b*) may increase as well.

The additional navigation buttons mentioned in the above description are enumerated for clarity of the description only, by which the present invention may be non-limited. And, various types of additional navigation buttons can be provided as well as the former additional navigation buttons shown in the above drawings.

In FIG. 5 (*a*) and FIG. 5 (*b*), a type and arrangement of a navigation button exposed in a navigation region are determined to correspond to a prescribed combination example selected from combination examples provided through a selection menu. Alternatively, a type and arrangement of a navigation button displayed on a navigation region can be manually adjusted. This is described in detail with reference to FIG. 7 as follows.

Figure 7:
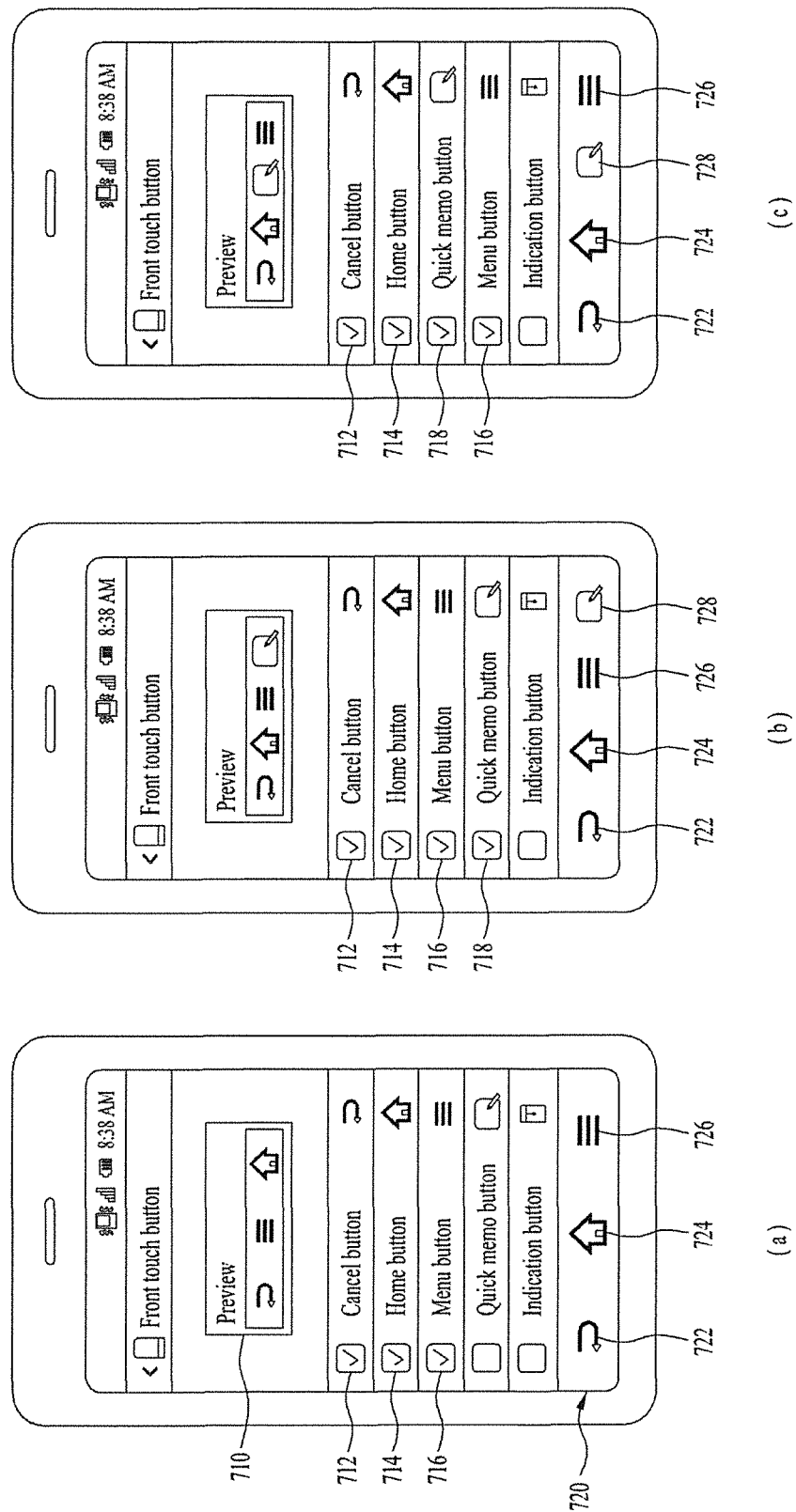
FIG. 7 is a diagram for one example of determining a type and arrangement of a navigation button manually.

FIG. 7 is a diagram for one example of determining a type and arrangement of a navigation button manually.

Referring to FIG. 7 (*a*), a controller can control a setting menu for selecting navigation buttons, which are desired to be displayed through a navigation region, to be displayed. And, a candidate list of navigation buttons displayable on the navigation region can be displayed on the setting menu. If at least one navigation button is selected from the candidate list, the controller can control the selected button(s) to be exposed in the navigation region. In doing so, in order to facilitate recognition of types and arrangements of the navigation buttons exposed in the navigation region, the controller can control a preview image in the navigation region to be displayed on a preview region 710.

In the example shown in FIG. 7 (*a*), mandatory navigation buttons 712, 714 and 716 are selected from the candidate list. Hence, the mandatory navigation buttons 722, 724 and 726 can be exposed in the navigation region 720 only. If an additional navigation button is selected from the setting menu shown in FIG. 7 (*a*), the controller can control the additional navigation button to be further displayed on the navigation region. For instance, if a quick memo button 718 is selected from the candidate list shown in FIG. 7 (*a*), referring to FIG. 7 (*b*), the controller can control the quick memo button 729 to be additionally displayed on the navigation region 720.

An arrangement sequence of the navigation buttons in the navigation region can be determined to correspond to a sequence exposed in the candidate list. Since a cancel button item 712, a home button item 714, a menu button item 716 and a quick memo button item 718 are arranged in top-to-bottom order in the candidate list shown in FIG. 7 (b), the cancel button 722, the home button 724, the menu button 726 and the quick memo button 728 may be arranged in the navigation region in order corresponding to the arrangement sequence of the candidate list. If a navigation key arrangement sequence is changed in the candidate list, the controller can control an arrangement sequence of the navigation buttons in the navigation region to be changed in a manner of following the changed arrangement sequence in the candidate list. For instance, if the quick memo button item 719 is shifted between the home button item 714 and the menu button item 716 in response to a user's touch input, referring to FIG. 7 (c), the controller can control the navigation buttons to be arranged in order of the cancel button 722, the home button 724, the quick memo button 729 and the menu button 728.

On the other hand, the controller can adjust arrangement of navigation buttons in response to a user's touch input to a preview image [not shown in the drawing]. For instance, if a position of the cancel button and a position of the menu button are switched to each other in the preview region shown in FIG. 7 (a), the switching result in the preview region is exactly applied to the navigation region, whereby a position of the cancel button and a position of the menu button can be switched to each other in the navigation region.

A color or transparency of a navigation region, a style of navigation buttons displayed on the navigation region and/or the like can be changed by user's settings. This is described in detail with reference to FIG. 8 as follows.

Figure 8:
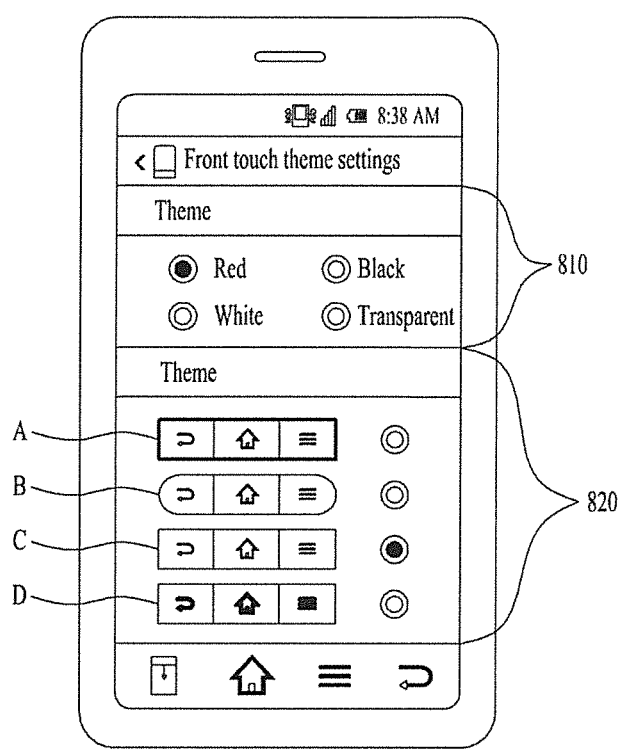
FIG. 8 is a diagram to describe one example of changing a theme of a navigation region.

FIG. 8 is a diagram to describe one example of changing a theme of a navigation region.

Referring to FIG. 8, a theme region 810 may be provided to adjust a color and/or transparency of a navigation region and a button style region 820 may be provided to display a style of buttons displayed through the navigation region.

By selecting a prescribed one of candidate items enumerated through the theme region 810, a user can change a color or transparency of the navigation region. For instance, if an item 'red' is selected from the theme region shown in FIG. 8, the controller may control the navigation region to be displayed in red. Hence, the navigation button may be displayed on a red background.

If a color of the navigation region is changed, the controller may be able to automatically change a color of a navigation button displayed on the navigation region. In doing so, in order to secure visibility of the navigation button, the controller may set the color of the navigation button to a complementary color of the color of the navigation region.

By selecting a prescribed one of candidate items enumerated through the style region 820, a user can adjust a style of navigation buttons displayed through the navigation region. For instance, the item A is to display the navigation buttons in quadrangular shape. And, the item B is to display the navigation buttons in quadrangular shape in a manner that one corner of each of the navigation buttons located at both ends is rounded. Each of the items C and D is provided to display the navigation buttons in icon shape without discriminating boundaries of the navigation buttons from each other. In particular, the item C may be provided to display the navigation buttons with thin solid lines. And, the item D may be provided to display the navigation buttons with bold solid line.

According to one embodiment of the present invention, the controller can change an arrangement of navigation buttons or a navigation button type in response to a touch input to a navigation region. This is described in detail with reference to FIG. 9A and FIG. 9B as follows.

Figure 9A:
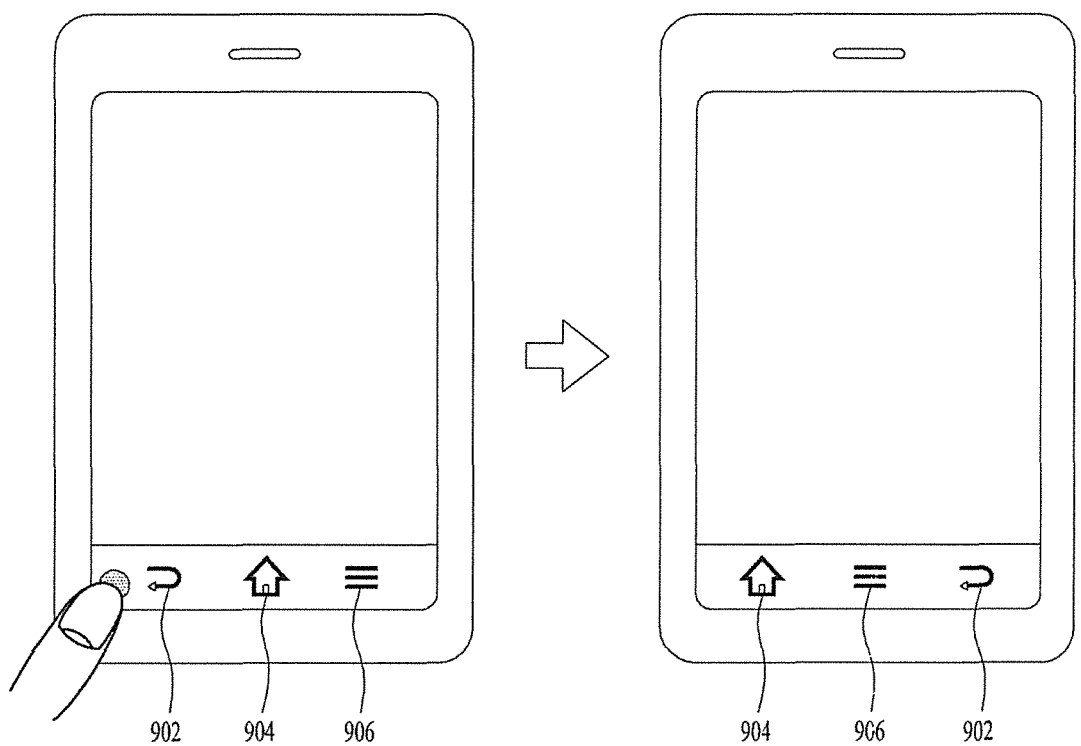
FIG. 9A is a diagram for one example of changing a navigation button arrangement in response to a touch input to a navigation region.
Figure 9B:
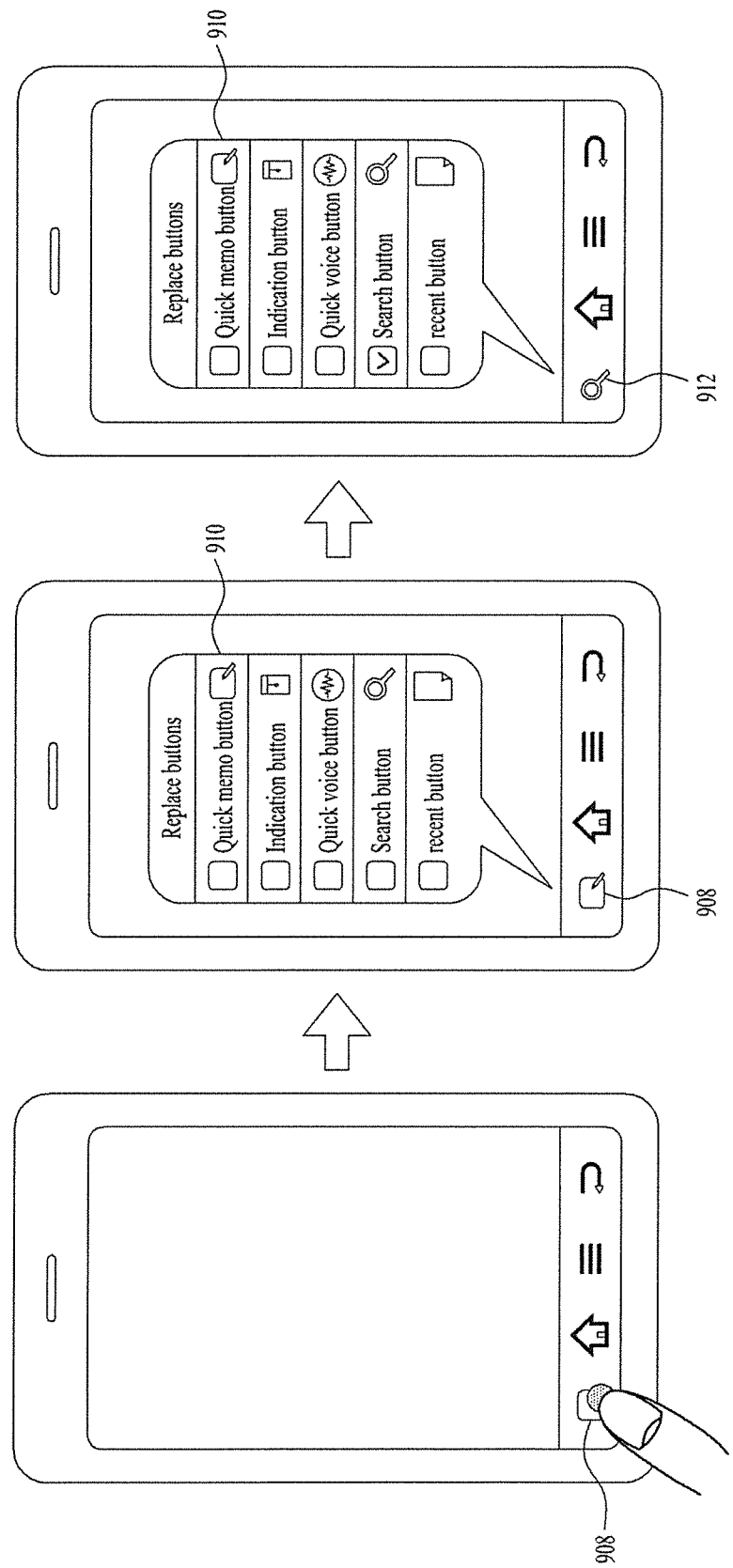
FIG. 9B is a diagram for one example of changing a navigation button type in response to a touch input to a navigation region.

FIG. 9A is a diagram for one example of changing a navigation button arrangement in response to a touch input to a navigation region, and FIG. 9B is a diagram for one example of changing a navigation button type in response to a touch input to a navigation region.

Referring to FIG. 9A, if a touch input to one end of a navigation region is received (e.g., if a user input of a touch to one end of the navigation region for prescribed duration is received), the controller can control an arrangement of navigation buttons to be changed. For instance, if a touch input of long pressing a left end of the navigation region is received, the controller can control the navigation buttons to move by one box each in a left direction. In doing so, the navigation button 902 used to located at a far left side moves to a far right side. For another instance, if a touch input of long pressing a right end of the navigation region is received, the controller can control the navigation buttons to move by one box each in a right direction [not shown in the drawing]. Thus, the controller can change the arrangement of the navigation buttons in response to a touch input to one of both ends of the navigation region.

Referring to FIG. 9B, if a touch input to a prescribed one of navigation buttons displayed on a navigation region is received (e.g., if a user input of touching a prescribed navigation button for prescribed duration is received), the controller can control a new navigation button to be displayed in a manner of replacing the former navigation button selected by the touch input. For instance, if a touch input of long pressing a quick memo button 908 is received, the controller can control a list 910 of candidate buttons, each of which is displayable in place of the quick memo button 908, to be displayed. If a prescribed button candidate is selected from the candidate button list 910, the controller can control the selected prescribed button (e.g., a search button 912 shown in FIG. 9B) to be displayed in place of the quick memo button 908.

A mobile terminal according to the present invention can set a mandatory navigation button not to be replaceable and can set an additional navigation button to be replaceable only, in a manner of discriminating the mandatory navigation button from the additional navigation button. Optionally, it is a matter of course that the replacement of the mandatory navigation button is available.

As mentioned in the foregoing description of the embodiments, various settings related to a navigation region and navigation buttons exposed in the navigation region can be manually adjusted by a user. The navigation region and the navigation buttons displayed through the navigation region shall be described in detail as follows.

<Display of Arrow Button>

A controller can control an arrow button to be further displayed on a navigation region in addition to navigation buttons. The arrow button can be used to adjust a location of a cursor indicating a region to which a text will be inputted. Whether to display an arrow button on a navigation region can be manually adjusted by a user setting or can be automatically determined in response to an operating status of a mobile terminal. For instance, only if a cursor for inputting a text through a mobile terminal is displayed, a controller can control an arrow button to be displayed.

Figure 10:
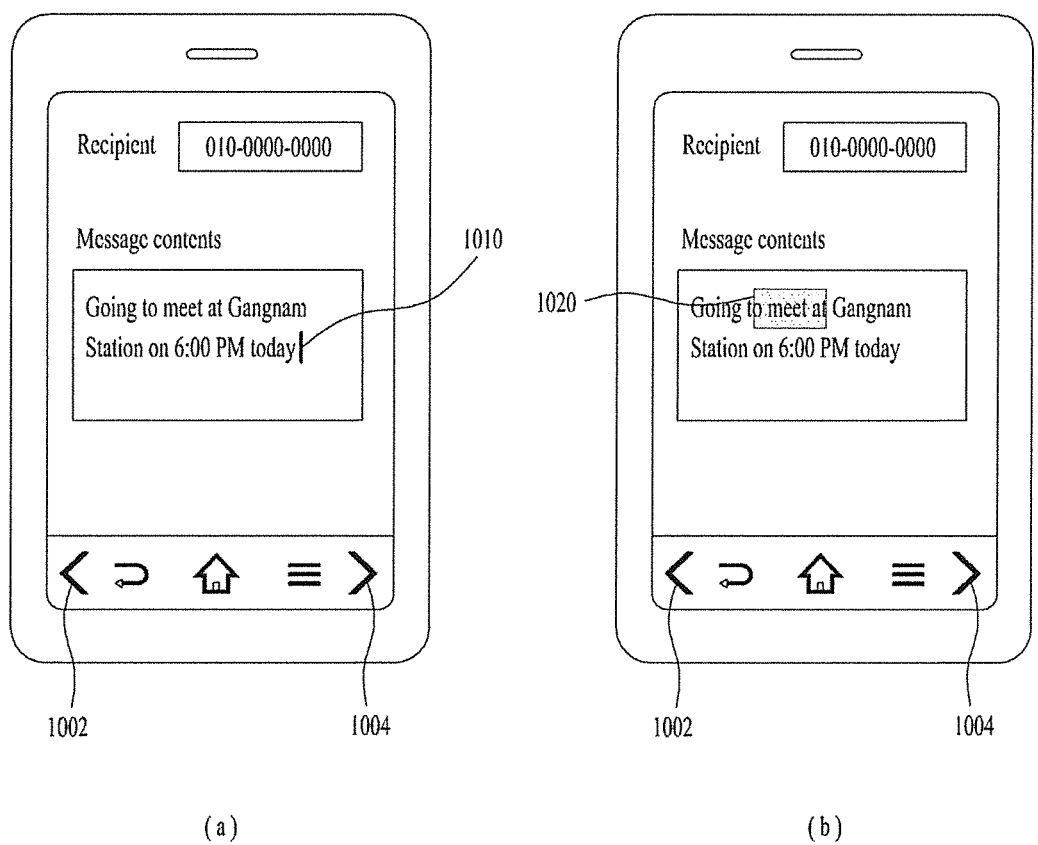
FIG. 10 is a diagram for one example of displaying an arrow button on a navigation region.

FIG. 10 is a diagram for one example of displaying an arrow button on a navigation region.

Referring to FIG. 10 (a), a controller can control a pair of arrow buttons 1002 and 1004 to be displayed on both ends of a navigation region, respectively. If one of a pair of the arrow buttons 1002 and 1004 is touched, the controller can adjust a location of a cursor 1010 to correspond to a direction indicated by the touched button.

While the touch to the arrow button is maintained, when the cursor keeps moving in the direction indicated by the arrow button, the controller can control a text, which lies on a moving path of the cursor, to be selected. For instance, if a touch to a left arrow is maintained for a prescribed duration, referring to FIG. 10 (*b*), the controller can control a text, which lies on a path of a cursor having moved for the prescribed duration of maintaining the touch to the left arrow, to be selected [cf. a reference number 1020]. In this case, the selected text can be temporarily saved in a memory by copying, cutting or the like.

In the example shown in FIG. 10, a pair of the arrow buttons 1002 and 1004 are located at both ends of the navigation region, respectively. Alternatively, locations of the arrow buttons can be set different from those shown in FIG. 10.

<Diversion of Navigation Button>

When a mobile terminal is held by a hand, it may be difficult to touch a navigation button, which is located in a direction opposite the hand, with the hand by which the mobile terminal is held. In particular, if a user holds a mobile terminal by his right hand, it may be inconvenient for the user to touch a navigation button, which is located at a left part of a navigation region, with his right hand. Likewise, if a user holds a mobile terminal by his left hand, it may be inconvenient for the user to touch a navigation button, which is located at a right part of a navigation region, with his left hand. In order to settle the above-mentioned inconvenience, a controller can temporarily change a usage of a navigation button located at one end of a navigation region into a usage of a navigation button located at the other end of the navigation region. This is described in detail with reference to FIG. 11 as follows.

Figure 11:
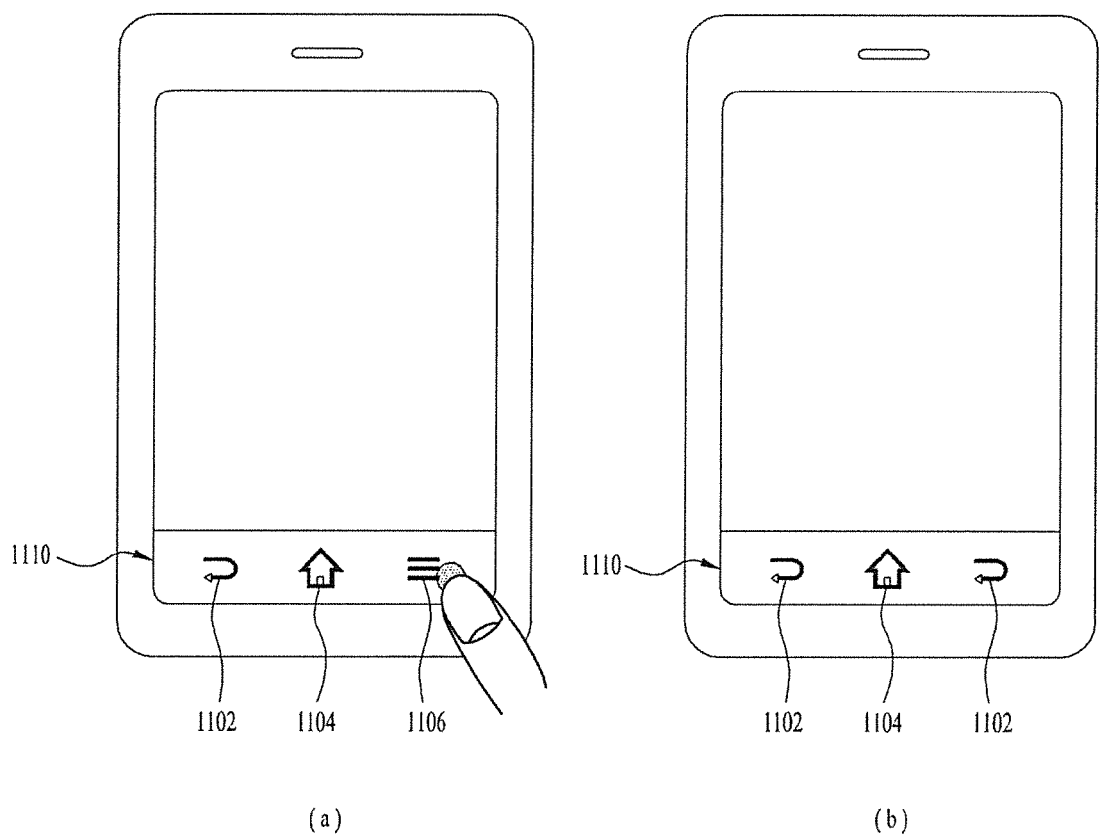
FIG. 11 is a diagram to describe one example of changing a usage of a navigation button temporarily.

FIG. 11 is a diagram to describe one example of changing a usage of a navigation button temporarily. For clarity of the following description, assume that a cancel button 1102, a home button 1104 and a menu button 1106 are sequentially arranged in a navigation region 1110 in left-to-right order.

Referring to FIG. 11, if a touch input of touching the menu button 1106 located at a right end of the navigation region 1110 for a prescribed duration is received [FIG. 11 (*a*)], a controller can control the menu button 1106 to be temporarily changed into the cancel button 1102 located at a left end of the navigation region 1110 [FIG. 11 (*b*)]. For instance, if a touch input of touching the cancel button 1102 located at the left end of the navigation region 1110 for a prescribed duration is received, the controller can control the cancel button 1102 to be temporarily changed into the menu button 1162 located at the right end of the navigation region 1110 [not shown in the drawing]. The changed navigation button may return to the original navigation button after expiration of a prescribed time.

<Change of Navigation Button Settings in Consideration of Location of Hand for Holding Mobile Terminal>

As mentioned in the foregoing description, when a mobile terminal is held by a hand, it may be difficult to touch a navigation button, which is located in a direction opposite the hand, with the hand by which the mobile terminal is held. In order to provide a user with convenience of manipulation on a navigation region, a controller can control a display position or size of a navigation button in a navigation region to be adjusted in response to a position of a hand by which a mobile terminal is held. An operation of a mobile terminal in response to a position of a mobile terminal holding hand is described in detail with reference to FIG. 12 and FIG. 13 as follows.

Figure 12:
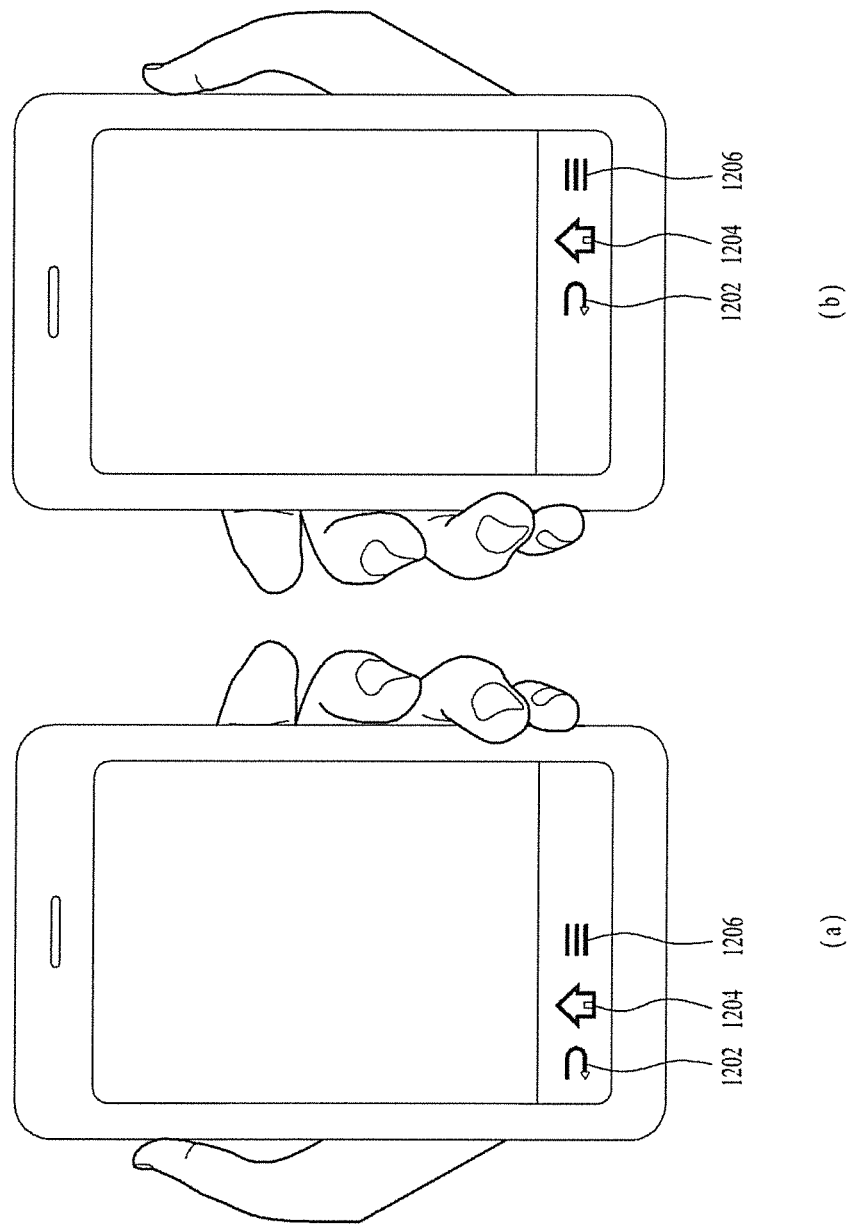
FIG. 12 is a diagram for one example of adjusting a displayed location of navigation buttons in response to a position of a hand by which a mobile terminal is held.

FIG. 12 is a diagram for one example of adjusting a displayed location of navigation buttons in response to a position of a hand by which a mobile terminal is held.

Referring to FIG. 12, in order to enhance the convenience of touching a navigation button in a navigation region with a hand by which a mobile terminal is held, a controller can control navigation buttons in the navigation region to be dominantly located in the same direction of a position of the mobile terminal holding hand. For instance, when a user holds a mobile terminal by his left hand, referring to FIG. 12 (*a*), the controller can control the navigation buttons 1202, 1204 and 1206 to be dominantly located to the left side. For another instance, when a user holds a mobile terminal by his right hand, referring to FIG. 12 (*b*), the controller can control the navigation buttons 1202, 1204 and 1206 to be dominantly located to the right side. Therefore, when a user holds a mobile terminal by his hand, the user can touch a navigation button, which is located opposite the mobile terminal holding hand, with the mobile terminal holding hand more conveniently.

Figure 13:
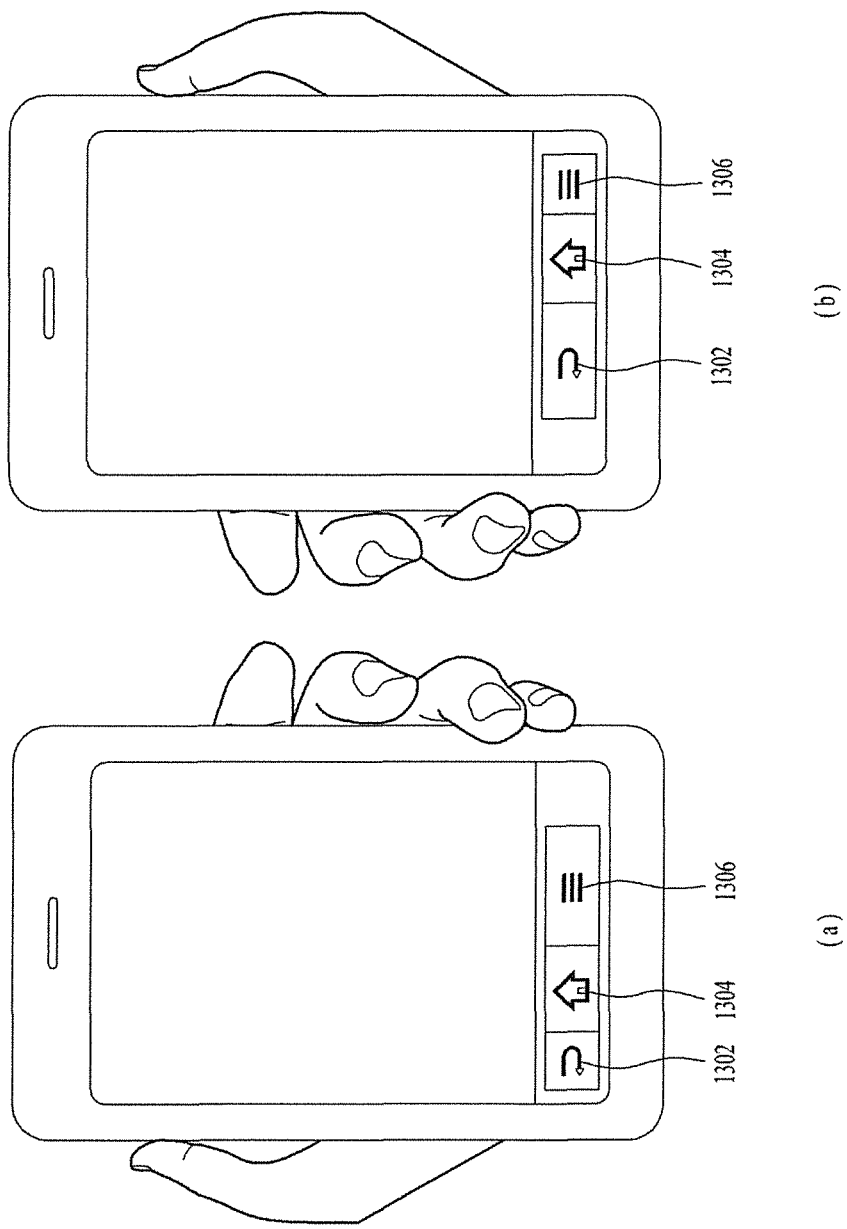
FIG. 13 is a diagram for one example of adjusting a size of a navigation button in response to a position of a hand by which a mobile terminal is held.

FIG. 13 is a diagram for one example of adjusting a size of a navigation button in response to a position of a hand by which a mobile terminal is held.

Referring to FIG. 13, in order to enhance the convenience of manipulating navigation buttons in a navigation region with a hand by which a mobile terminal is held, a controller can control navigation buttons in the navigation region to increase in size in proportion to a distance from the mobile terminal holding hand.

For instance, when a user holds a mobile terminal by his left hand, referring to FIG. 13 (*a*), the controller can control the navigation buttons 1302, 1304 and 1306 to gradually increase in size toward a right side of the navigation region from a left side of the navigation region. For another instance, when a user holds a mobile terminal by his right hand, referring to FIG. 13 (*b*), the controller can control the navigation buttons 1302, 1304 and 1306 to gradually increase in size toward the left side of the navigation region from the right side of the navigation region. As mentioned in the foregoing description of the examples with reference to FIG. 12 and FIG. 13, a controller controls navigation buttons to be dominantly located to one side in a navigation region or to unequally differ from each other in size, thereby facilitating the navigation buttons to be manipulated with a mobile terminal holding hand.

The position of the mobile terminal holding hand can be determined based on a detection signal of a sensing unit or a touch input of a user. For instance, in case of receiving a flicking input in a left direction along a trajectory across at least one navigation button within a navigation region, a controller can determine that the user holds a mobile terminal by his left (or right) hand. On the contrary, in case of receiving a flicking input in a right direction along a trajectory across at least one navigation button within a navigation region, a controller can determine that the user holds a mobile terminal by his right (or left) hand.

<Redundant Provision of Navigation Buttons>

In the foregoing descriptions with reference to the accompanying drawings, a prescribed region of a bottom part of a display unit is set as a navigation region. In this case, if a user holds a top part of the display unit, it may cause inconvenience to the user in manipulating the navigation region. Hence, a controller may redundantly provide navigation buttons provided through the navigation region. This is described in detail with reference to FIG. 14 as follows.

Figure 14:
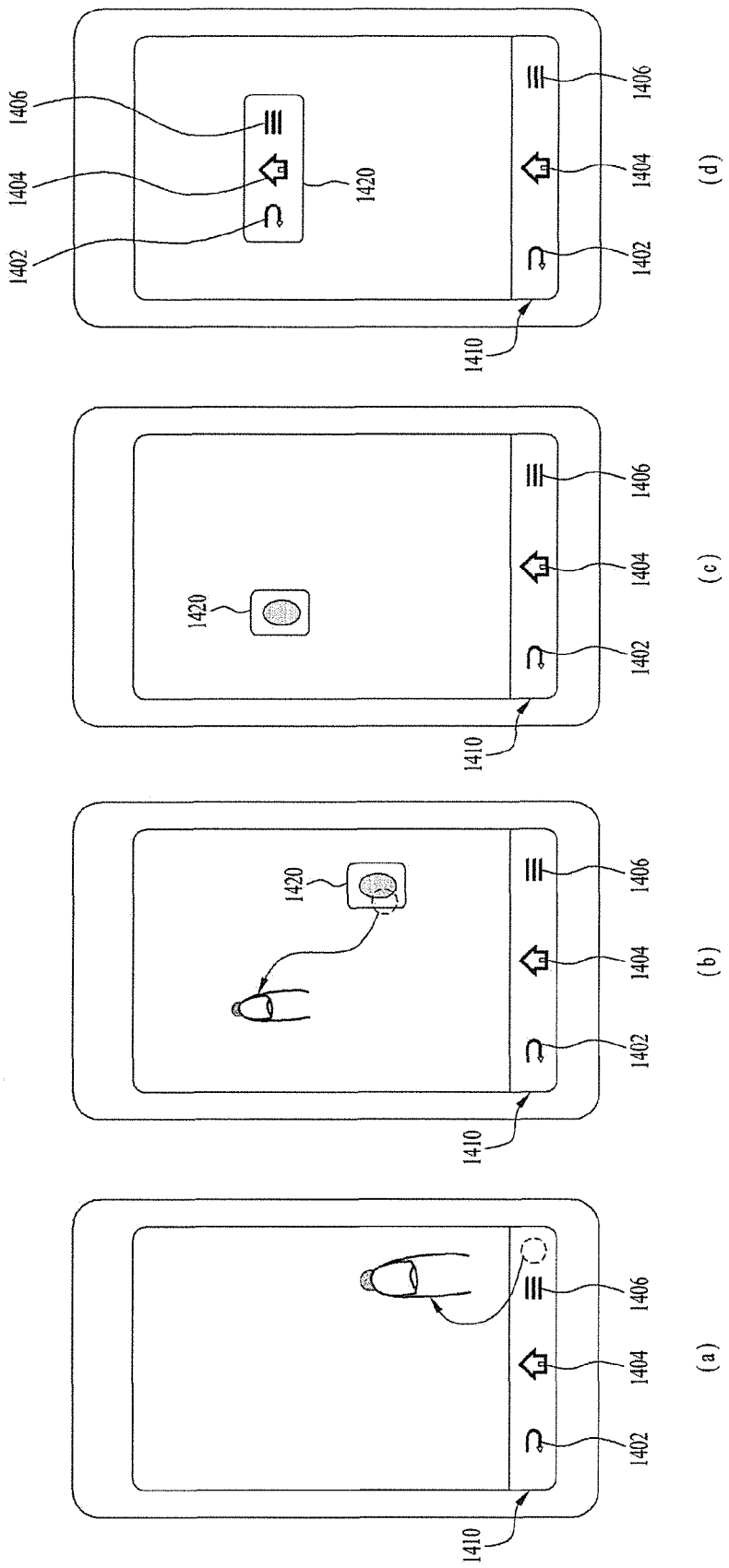
FIG. 14 is a diagram for one example of providing navigation buttons redundantly.

FIG. 14 is a diagram for one example of providing navigation buttons redundantly.

Referring to FIG. 14, if a drag & drop input is applied from an inside of a navigation region 1410 to an outside of the navigation region 1410 [FIG. 14 (a)], a controller can control a navigation object 1420, which is provided to page navigation buttons, to be displayed at the drop point [FIG. 14 (b)]. A location of the navigation object 14520 can be arbitrarily changed in response to a user's touch input. For instance, referring to FIG. 14 (b) and FIG. 14 (c), if a drag & drop input is applied to the navigation object 1420, a display position of the navigation object 1420 is shifted to the drop point. If the navigation object 1420 is touched, the controller increases a size of the navigation object 1420 and then controls the same navigation buttons 1402, 1404 and 1406, which are provided through the navigation region 1410, to be displayed through the increasing navigation object. Thus, the navigation buttons 1402, 1404 and 1406 can be redundantly provided through both of the navigation object 1420 and the navigation region 1410.

If a navigation object is used, a user may be able to control navigation buttons to be displayed at desired points, respectively. Hence, user's accessibility to the navigation buttons is increased, whereby user's convenience of manipulation can be enhanced.

<Hiding of Navigation Region>

As a portion of a display region is assigned as a navigation region, an information amount displayable through a display unit may be reduced as much as the navigation region. In order to prevent a displayable information amount from being reduced due to the navigation region, a controller hides the navigation region in the course of running an application and can control the navigation region to temporarily appear if necessary. This is described in detail with reference to FIG. 15 as follows.

Figure 15:
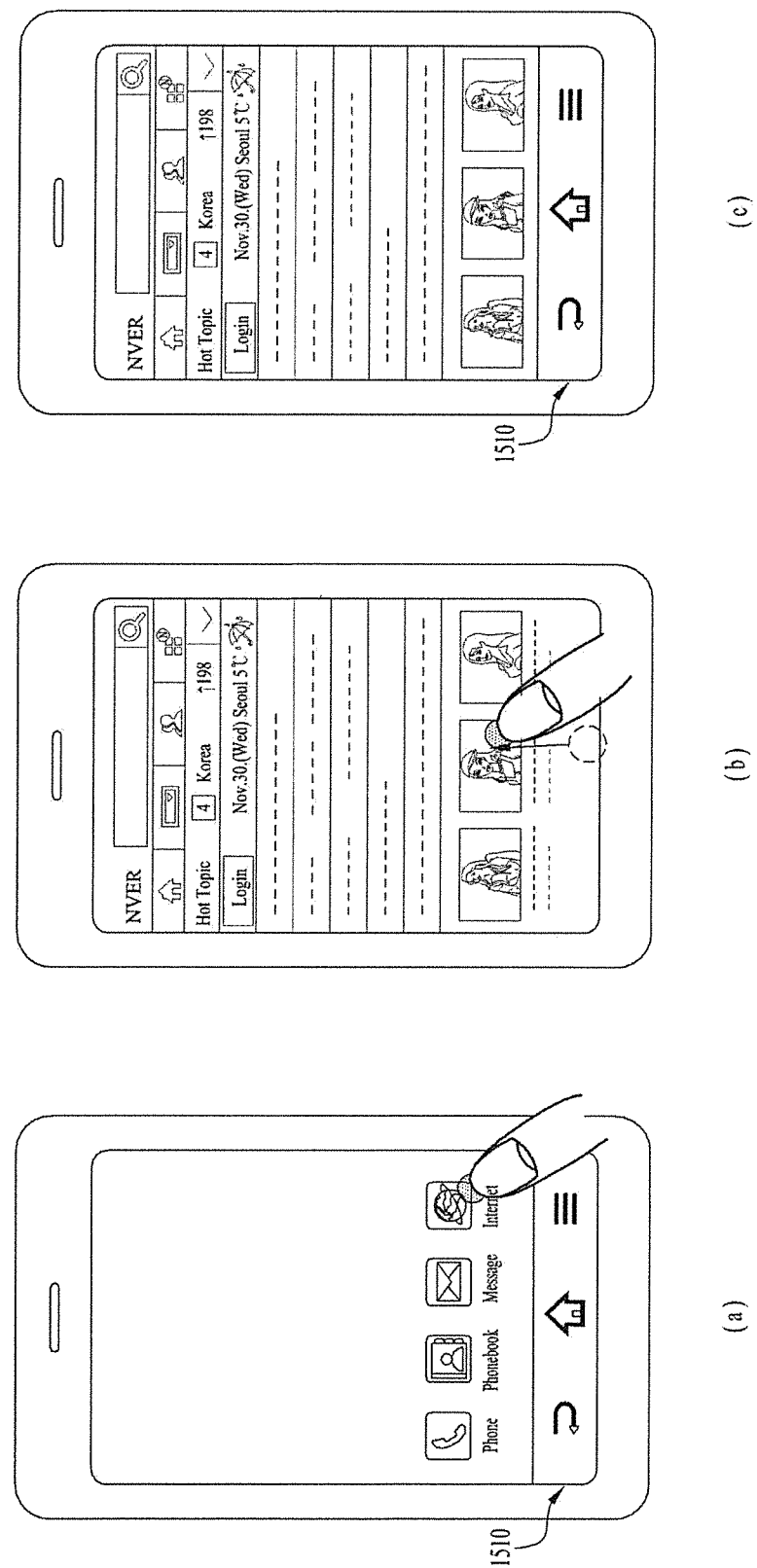
FIG. 15 is a diagram to describe one example of stopping a display of a navigation region.

FIG. 15 is a diagram to describe one example of stopping a display of a navigation region.

Referring to FIG. 15, if an application is activated by a user's appropriate manipulation, referring to FIG. 15 (a) and FIG. 15 (b), a controller can control a navigation region 1510 to stop being displayed (e.g., a web browser is activated in FIG. 15 (a) and FIG. 15 (b)). As the navigation region 1510 stops being displayed, an active screen of the application can be outputted in larger size.

While the application is active, if an appropriate user input is received, the controller can resume the display of the navigation region 1510 temporarily. For instance, if a flicking input in top direction is applied to a bottom part of the display unit [FIG. 15 (b)], the controller can control the display of the navigation region 1510 to be resumed [FIG. 15 (c)]. Thus, the user can appropriately manipulate the mobile terminal using the display-resumed navigation region 1510.

If a prescribed time expires from a timing point of the user manipulation on the navigation region 1510 (i.e., if the user does not manipulate the navigation region 1510 for the prescribed time), the controller can control the display of the navigation region 1510 to be stopped again.

<Toggle with Dock Region>

While a home screen image or an installed application list is being displayed, a prescribed portion of a display region can be set as a dock region. In this case, the dock region is the region in which icons frequently used by a user are gathered. Even if a page of a home screen image or a page of an application list is changed, the dock region can be maintained by being fixed thereto.

Figure 16:
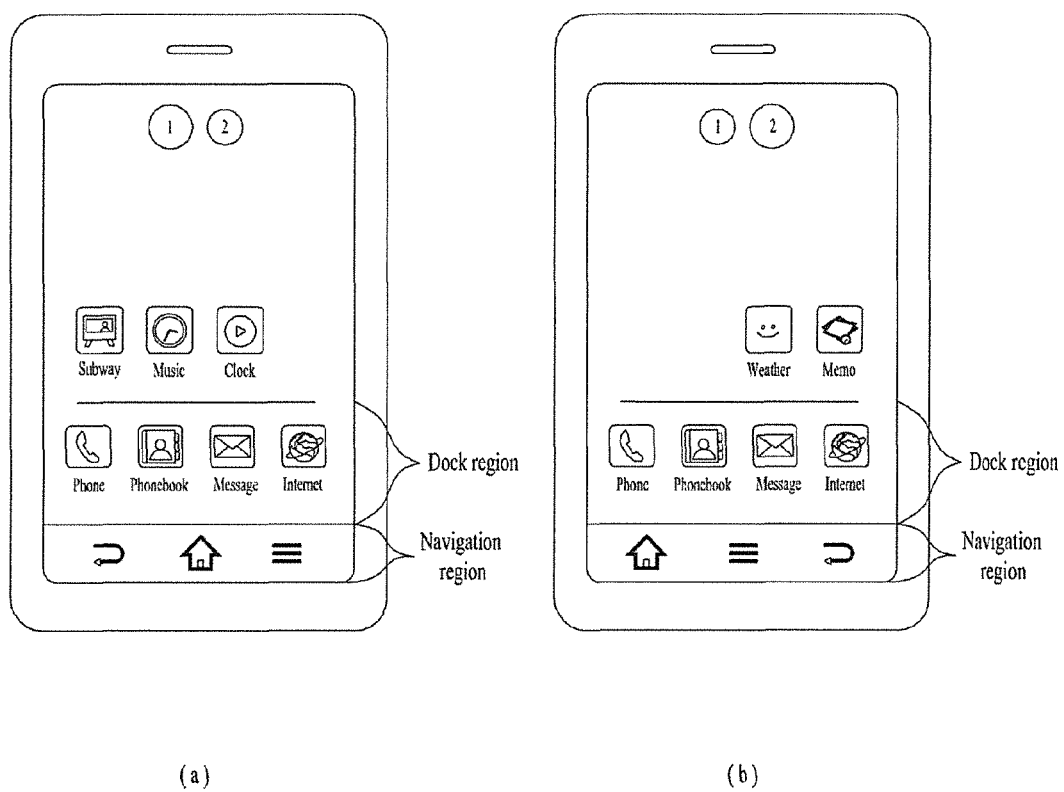
FIG. 16 is a diagram to describe one example of a dock region.

FIG. 16 is a diagram to describe one example of a dock region.

Referring to FIG. 16, while a home screen image is outputted, a prescribed region of a display unit can be set as a dock region [FIG. 16 (a), FIG. 16 (b)]. Even if a page of the home screen image is changed, the dock region can be fixedly maintained. For instance, referring to FIG. 16 (a) and FIG. 16 (b), even if a home screen image is changed from page 1 to page 2, icons in the dock region can be maintained intact without being changed.

For clarity of the following description, an icon fixedly displayed through a dock region shall be named a dock icon.

If a dock region and a navigation region are fixedly assigned, it may cause a problem that an information amount displayable through a remaining region is reduced as much as the assigned dock and navigation regions. In order to solve this problem, a mobile terminal according to the present invention can control either a dock region or a navigation region to be selectively displayed. This is described in detail with reference to FIG. 17 as follows.

FIG. 17 is a diagram to describe one example of displaying a dock region or a navigation region selectively.

Referring to FIG. 17 (a) and FIG. 17 (b), toggle buttons 1712 and 1722 can be displayed on a navigation region 1710 and a dock region 1720, respectively. While the navigation region 1710 is displayed, if the toggles button 1712 in the navigation region 1710 is touched, a controller stops displaying the navigation region 1710 and then controls the dock region 1720 to be displayed. On the contrary, while the dock region 1720 is displayed, if the toggle button 1722 in the dock region 1720 is touched, the controller stops displaying the dock region 1720 and then controls the navigation region 1710 to be displayed [FIG. 17 (a)].

Thus, the controller can control either the navigation region 1710 or the dock region 1720, as shown in FIG. 7, to be displayed selectively.

<Navigation Region Configured with a Plurality of Pages>

A mobile terminal according to the present invention can control a dock icon, which is to be outputted through a dock region, to be outputted through a navigation region instead of omitting a display of the dock region. This is described in detail with reference to FIG. 18 as follows.

Figure 18:
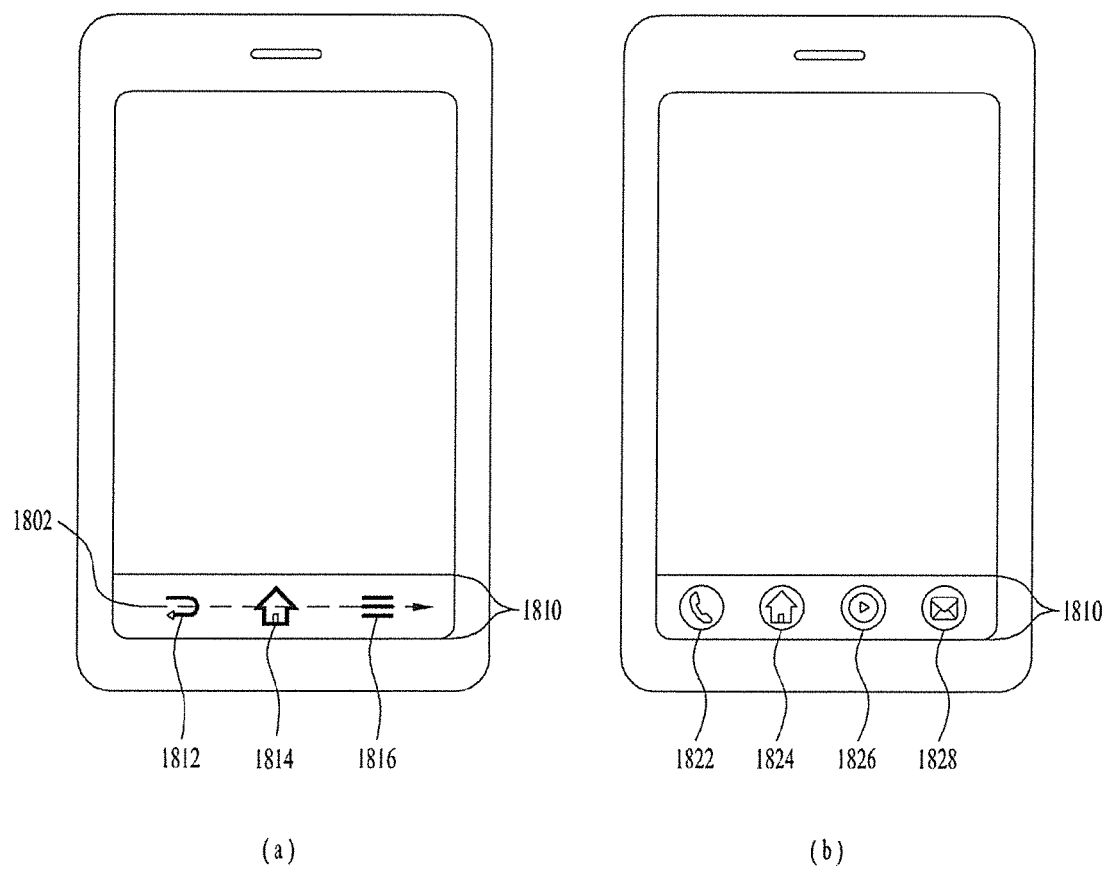
FIG. 18 is a diagram to describe one example of displaying a dock icon through a navigation region.

FIG. 18 is a diagram to describe one example of displaying a dock icon through a navigation region.

Referring to FIG. 18, while navigation buttons 1812, 1814 and 1816 are displayed through a navigation region 1810, if a touch input along a trajectory 1802 across the navigation region 1801 is received [FIG. 18 (a)], a controller can control dock icons 1822, 1824, 1826 and 1828 to be displayed on the navigation region 1810 instead of the navigation buttons 1812, 1814 and 1816 [FIG. 18 (b)]. On the contrary, while the dock icons 1822, 1824, 1826 and 1828 are displayed on the navigation region 1810, if a touch input along a trajectory 1802 across the navigation region 1810, the navigation buttons 1812, 1814 and 1816 can be displayed instead of the dock icons 1822, 1824, 1826 and 1828.

Like the example shown in FIG. 18, the controller can configure the navigation region with a page including the navigation buttons 1812, 1814 and 1816 and a page including the dock icons 1822, 1824, 1826 and 1828. If a user input for changing a page for the navigation region is received, the controller can toggle the navigation buttons and the dock icons.

<Hiding of Dock Region>

A mobile terminal according to the present invention can control a button (hereinafter named a dock button), which is capable of turning on/off a display a dock region, to be displayed on a navigation region. In response to a user input to the dock button, a controller can display the dock region or stop displaying the dock region. This is described in detail with reference to FIG. 19 as follows.

Figure 19:
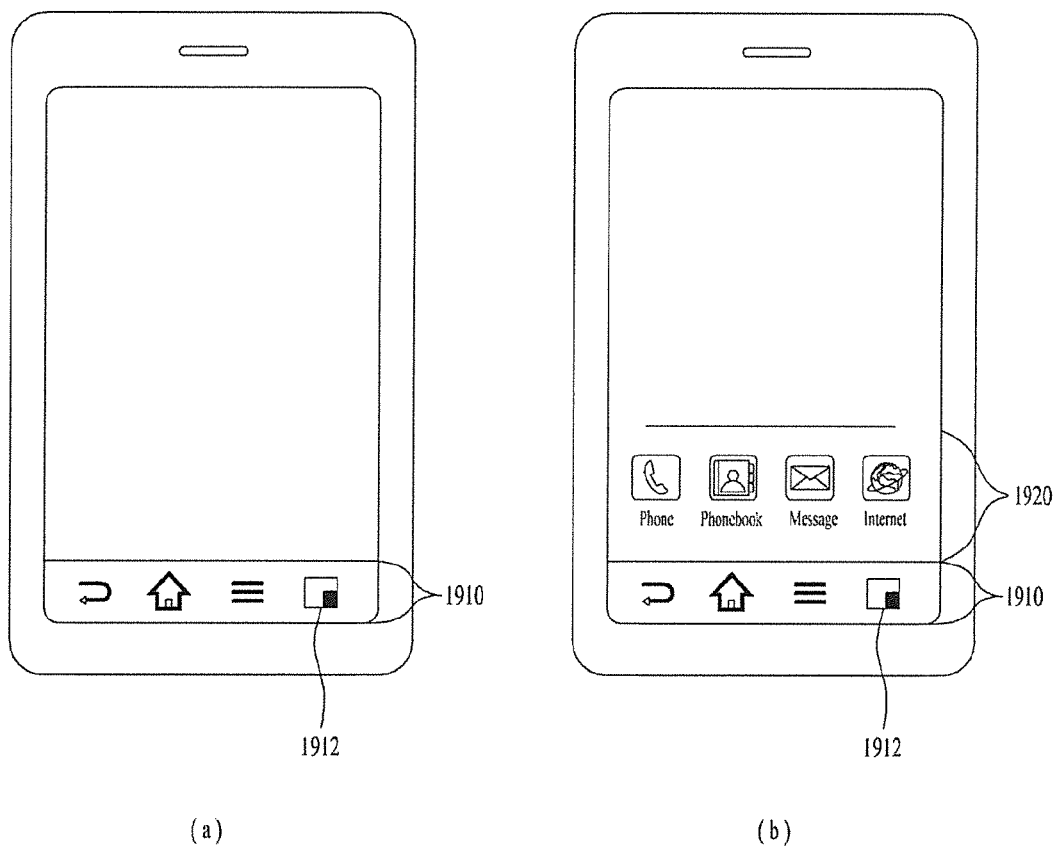
FIG. 19 is a diagram to describe one example of turning on/off a display of a dock region.

FIG. 19 is a diagram to describe one example of turning on/off a display of a dock region.

Referring to FIG. 19, a dock button 1912 for turning on/off a display of a dock region 1920 can be displayed on a navigation region 1910 [FIG. 19 (a)]. While the dock region 1920 is not displayed, if the dock button 1912 in the navigation region 1910 is touched, a control can control the dock region 1920 to be displayed [FIG. 19 (b)]. On the contrary, while the dock region 1920 is displayed [FIG. 19 (b)], if the dock button 1912 in the navigation region 1910 is touched, the controller can control the display of the dock region 1920 to be stopped [FIG. 19 (a)].

Like the example shown in FIG. 19, the controller can control whether to display the dock region 1920 using the dock button 1912 provided to the navigation region 1910. Since the dock region 1920 is exposed only if a user wants to, more information can be displayed on a wider region.

<Settings of Main Button and Sub Button>

As a method of reducing a spatial region occupied by a dock region or a navigation region, a controller can simultaneously provide dock icons and navigation icons to one integrated region. In this case, one of the dock icons may be set as a main button, while the other may be set as a sub button. The controller handles a $1^{st}$ touch input to the integrate region as an input for selecting the main button and also handles a 1nd touch input to the integrated region as an input for selecting the sub button, thereby enabling a user to appropriately manipulate the dock icon and the navigation icon. This is described in detail with reference to FIG. 20 as follows.

Figure 20:
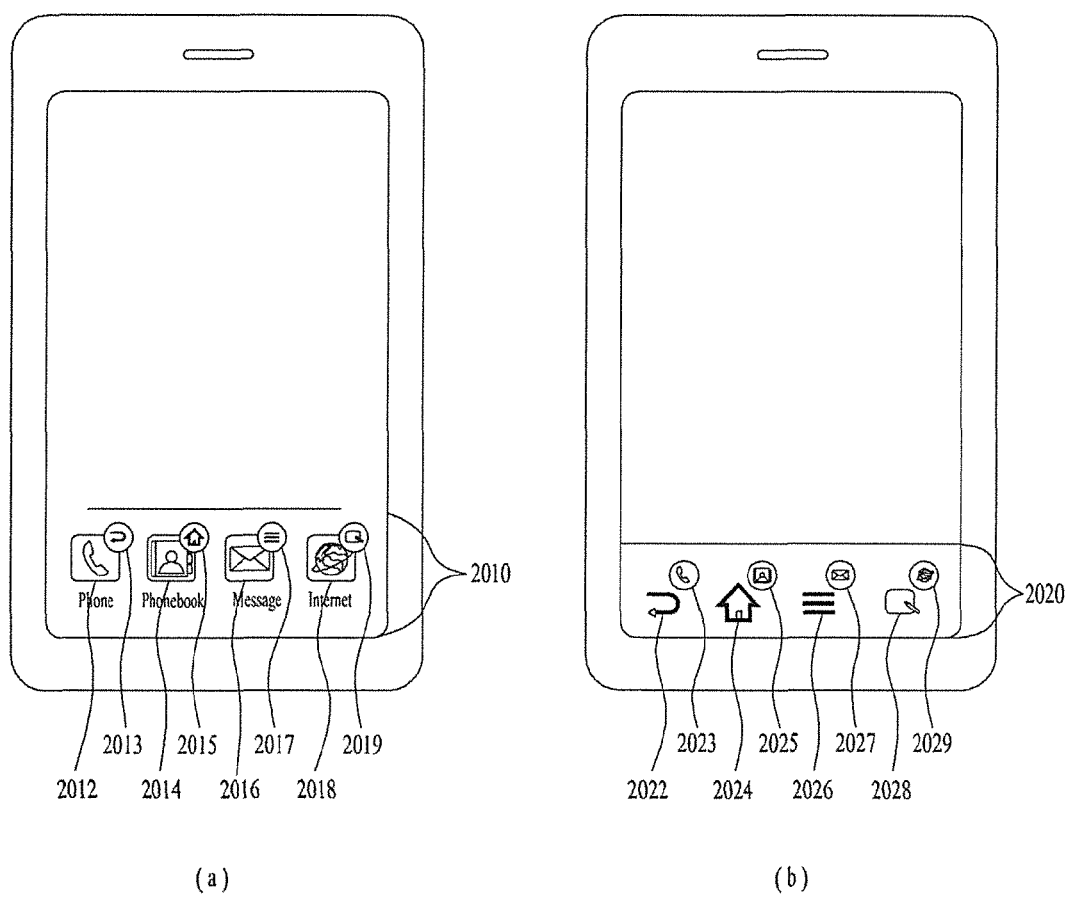
FIG. 20 is a diagram to describe one example of providing both a dock icon and a navigation icon to an integrated region.

FIG. 20 is a diagram to describe one example of providing both a dock icon and a navigation icon to an integrated region. FIG. 20 (a) shows one example that dock icons 2012, 2014, 2016 and 2018 and navigation buttons 2013, 2015, 2017 and 2019 are simultaneously displayed through a dock region 2010. And, FIG. 20 (b) shows one example that dock icons 2023, 2025, 2027 and 2029 and navigation buttons 2022, 2024, 2026 and 2028 are simultaneously displayed through a navigation region 2020.

In case that navigation buttons and dock icons are simultaneously displayed, a controller can set one of the navigation button and the dock icon as a main button and can set the other as a sub button.

FIG. 20 (a) shows one example of an output when the dock icons 2012, 2014, 2016 and 2018 and the navigation buttons 2013, 2015, 2017 and 2019 are set as main buttons and sub buttons, respectively. In particular, the navigation button set as the sub button can be linked to the dock icon set as the main button (e.g., the phone icon 2012 and the cancel button 2013 are linked to each other, the phonebook icon 2014 and the home button 2015 are linked to each other, the message icon 2016 and the menu button 2017 are linked to each other, and the internet icon 2018 and the quick menu icon 2019 are linked to each other). If a $1^{st}$ touch input is inputted to one of the dock icons 2012, 2014, 2016 and 2018 displayed on the dock region 2010, the controller determines that the dock icon, which is the main button, is selected and is then able to process a control command appropriate for the selected dock icon. On the other hand, if a $2^{nd}$ touch input is inputted to one of the dock icons 2012, 2014, 2016 and 2018 displayed on the dock region 2010, the controller determines that the navigation button, which is the sub button, is selected and is then able to process a control command appropriate for the selected navigation button.

For instance, if the $1^{st}$ touch input to the phone icon 2012 is received, the controller determines that the phone icon 2012 is selected and is then able to process a control command appropriate for the selected icon. On the other hand, if the $2^{nd}$ touch input to the phone icon 2012 is received, the controller determines that the cancel button 2014 linked to the phone icon 2012 is elected and is then able to process a control command appropriate for the selected button.

FIG. 20 (b) shows one example of an output when the navigation buttons 2022, 2024, 2026 and 2028 and the dock icons 2023, 2025, 2027 and 2029 are set as main buttons and sub buttons, respectively. As mentioned in the foregoing description, the dock icon set as the sub button can be linked to the navigation button set as the main button.

If a $1^{st}$ touch input is inputted to one of the navigation buttons 2022, 2024, 2026 and 2028 displayed on the navigation region 2020, the controller determines that the navigation button, which is the main button, is selected and is then able to process a control command appropriate for the selected navigation button. On the other hand, if a $2^{nd}$ touch input is inputted to one of the navigation buttons 2022, 2024, 2026 and 2028 displayed on the navigation region 2020, the controller determines that the dock icon, which is the sub button, is selected and is then able to process a control command appropriate for the selected dock icon.

For instance, if the $1^{st}$ touch input to the cancel button 2022 is received, the controller determines that the cancel button is selected and is then able to process a control command appropriate for the selected button. On the other hand, if the $2^{nd}$ touch input to the cancel button 2022 is received, the controller determines that the phone icon linked to the cancel button 2022 is selected and is then able to process a control command appropriate for the selected icon.

<Screen Partitioning>

If a navigation region is shifted by a drag, a mobile terminal according to one embodiment of the present invention can control a display unit to be partitioned into a plurality of regions with reference to a location to which the navigation region has been shifted. This is described in detail with reference to FIG. 21 as follows.

Figure 21:
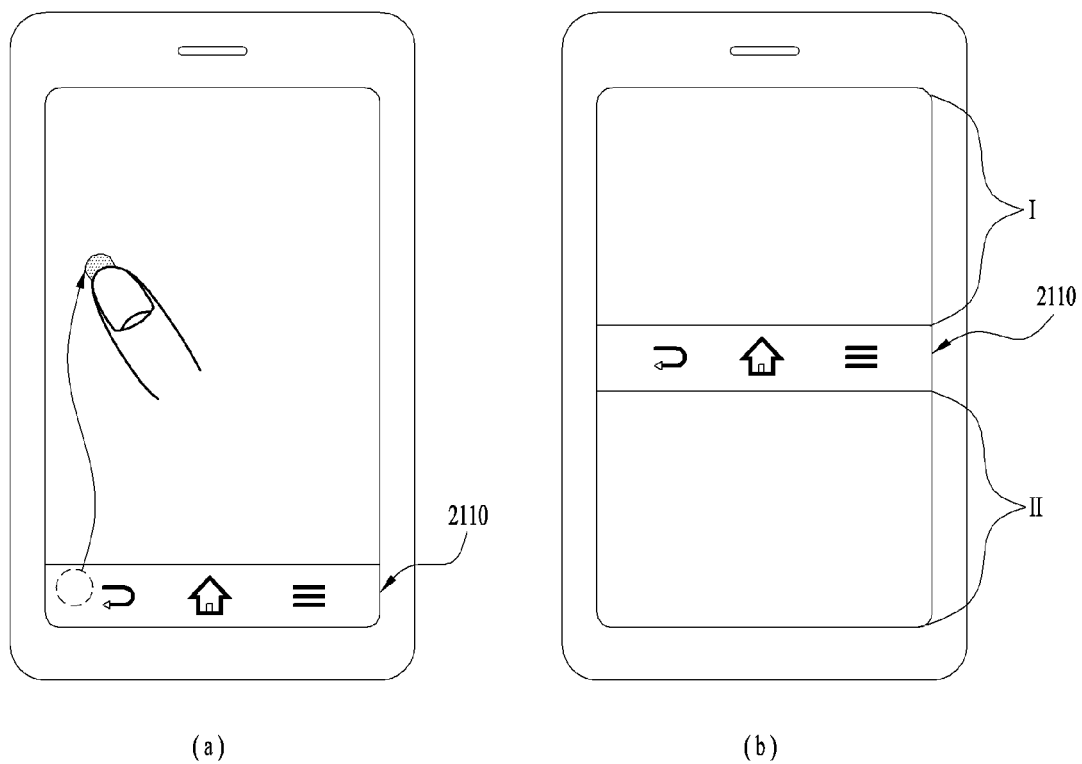
FIG. 21 is a diagram to describe one example of partitioning a display unit into a plurality of regions centering on a navigation region.

FIG. 21 is a diagram to describe one example of partitioning a display unit into a plurality of regions centering on a navigation region.

Referring to FIG. 21, if a drag & drop input for shifting a navigation region 2110 located at a bottom part of a display unit to a middle part of the display unit using a pointer is received [FIG. 21 (a)], a controller can control the navigation region 2110 to be shifted to a dropped position of the pointer [FIG. 21 (b)]. In doing so, the controller can control the display unit to be partitioned into two regions between which the navigation region 2110 is situated. In the example shown in FIG. 21 (b), the display unit is partitioned into a $1^{st}$ region I located at the top part of the navigation region 2110 and a $2^{nd}$ region II located at the bottom part of the navigation region 2110. Through the $1^{st}$ region I and the $2^{nd}$ region II, the controller can simultaneously process multiple tasks. For instance, while a 1st application is activated in the $1^{st}$ region I, a $2^{nd}$ application can be activated in the $2^{nd}$ region II.

While the display unit is partitioned into a plurality of regions, a user input to navigation buttons may have an effect on a prescribed one of a plurality of the regions.

For instance, after the $1^{st}$ region I has been touched, if navigation buttons are touched, the touch input to the navigation buttons may have an effect on the $1^{st}$ region I only. On the contrary, after the $2^{nd}$ region II has been touched, if the navigation buttons are touched, the touch input to the navigation buttons may have an effect on the $2^{nd}$ region II only.

For another instance, after the navigation buttons have been touched with a pointer, the controller can designate a region, on which the touch input has an effect, along a moving direction of the pointer. For instance, if the pointer, with which the navigation buttons is touched, moves into the $1^{st}$ region I, the controller can process a control command, which is attributed to the navigation button selection, through the $1^{st}$ region I. On the contrary, if the pointer, with which the navigation buttons is touched, moves into the $2^{nd}$ region II, the controller can process a control command, which is attributed to the navigation button selection, through the $2^{nd}$ region II.

<Setting of Navigation Button Effective Region>

According to the description of the former embodiment, a region, on which a navigation button has an effect, is determined depending on a region touched right before touching the navigation button or a moving direction of a pointer with which the navigation button is touched.

Unlike the above-described example, a controller can determine a region, on which a navigation button has an effect, depending on a location of a navigation region. This is described in detail with reference to FIG. 22 as follows.

Figure 22:
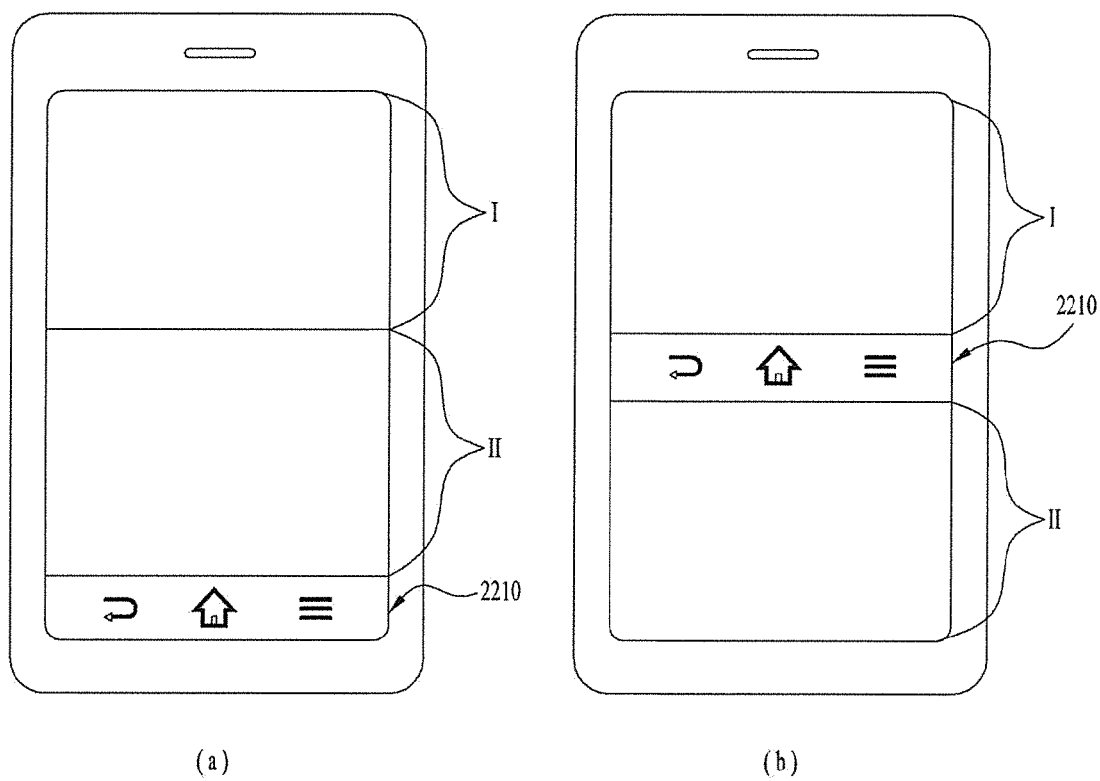
FIG. 22 is a diagram to describe one example of determining an effective range of a navigation button depending on a location of a navigation region.

FIG. 22 is a diagram to describe one example of determining an effective range of a navigation button depending on a location of a navigation region. For clarity of the following description, assume that a display unit is partitioned into two regions I and II.

Referring to FIG. 22, a controller can control a navigation button to have an effect on a region situated right above a navigation region 2210 only. For instance, referring to FIG. 22 (a), if the navigation region 2210 is situated right below the $2^{nd}$ region II, the controller can control the navigation button to have an effect on the $2^{nd}$ region II situated right above the navigation region 2210 only. If a location of the navigation region 2210 is changed into a location right below the $1^{st}$ region I, referring to FIG. 22 (b), the controller can control the navigation button to have an effect on the $1^{st}$ region I situated right above the navigation region 2210 only.

Therefore, a user can determine a region, on which a navigation button has an effect, in a manner of adjusting a location of the navigation region 2210.

<Navigation Region Display within Partitioned Region>

In case that a display unit of a mobile terminal is partitioned into a plurality of regions, a controller can control a navigation region to be displayed within each of a plurality of the regions. This is described in detail with reference to FIG. 22 as follows.

Figure 23:
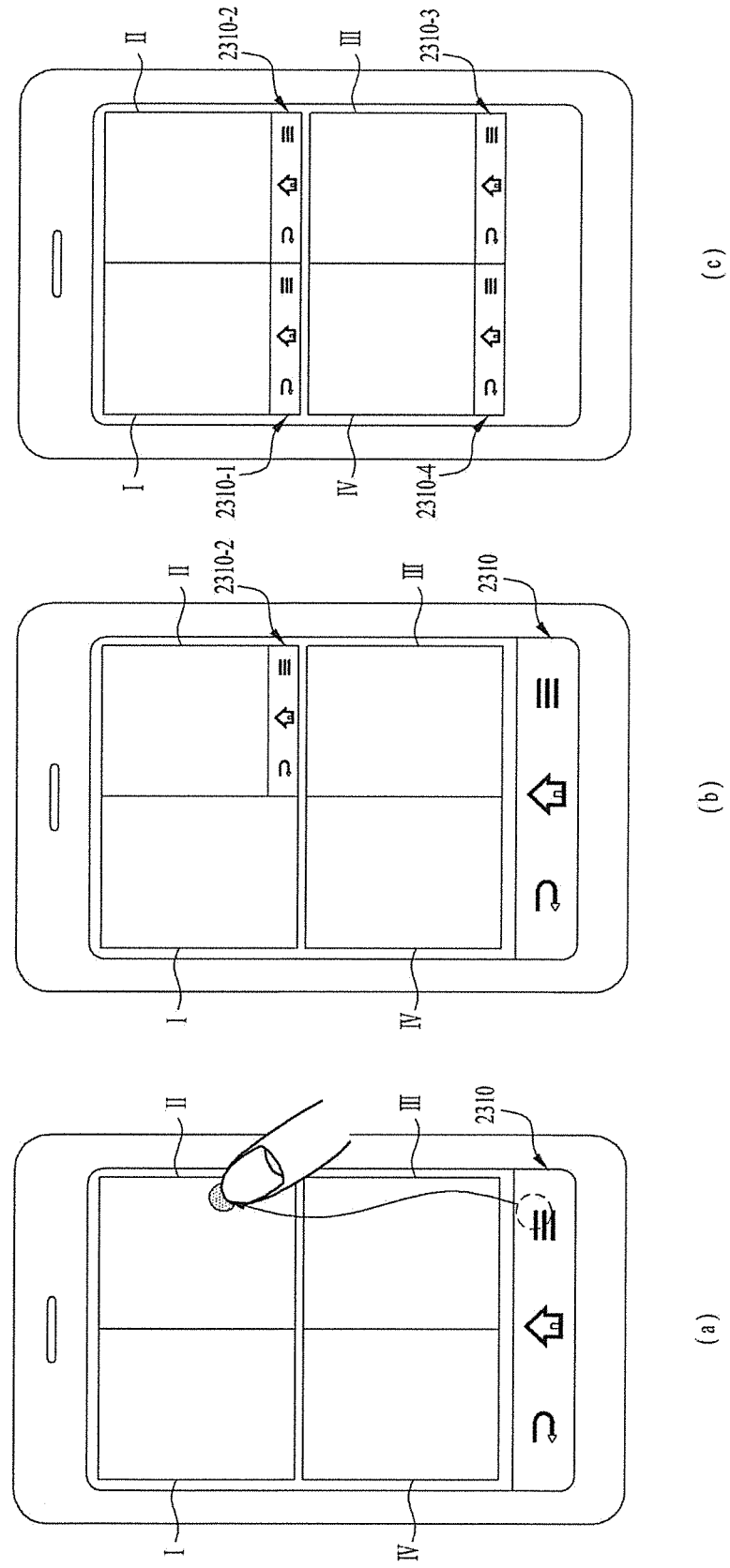
FIG. 23 is a diagram to describe one example of displaying a navigation region in a partitioned region.

FIG. 23 is a diagram to describe one example of displaying a navigation region in a partitioned region. For clarity of the following description, assume that a display unit includes 4 sub regions I to IV.

Referring to FIG. 23, a display unit can be provided with a main navigation region 2210 for having an effect on at least one of 4 sub regions I to IV. A touch input to the main navigation region 2210 may have an effect on one of the 4 sub regions. For instance, as mentioned in the foregoing description with reference to FIG. 20, after a $1^{st}$ sub region has been touched, if a navigation region is touched, the touch input to the navigation region may have an effect on the $1^{st}$ sub region only.

If a main navigation region 2310 is dragged to a prescribed one of a plurality of the sub regions I to IV (e.g., the navigation region is dragged to the $2^{nd}$ region II in FIG. 23 (a)), referring to FIG. 23 (b), the controller can control a sub navigation region 2310-2, which takes after the main navigation region 2310, to be displayed inside the selected region II.

A touch input to a sub navigation region within a sub region may have an effect on the corresponding region only but may not have an effect of a remaining region.

If sub navigation regions 2310-1, 2310-2, 2310-3 and 2310-4 are configured in all the sub regions, respectively, referring to FIG. 23 (c), the controller can control the main navigation region 2310 to stop being displayed.

<Output Example in Landscape Mode>

In the foregoing descriptions with reference to the accompanying drawings, a mode of the display unit is assumed as set to a vertical view mode (i.e., a portrait mode). When a mode of a display unit is set to a horizontal view mode (i.e., a landscape mode), an output of the display unit is described in detail with reference to the accompanying drawings as follows.

Figure 24:
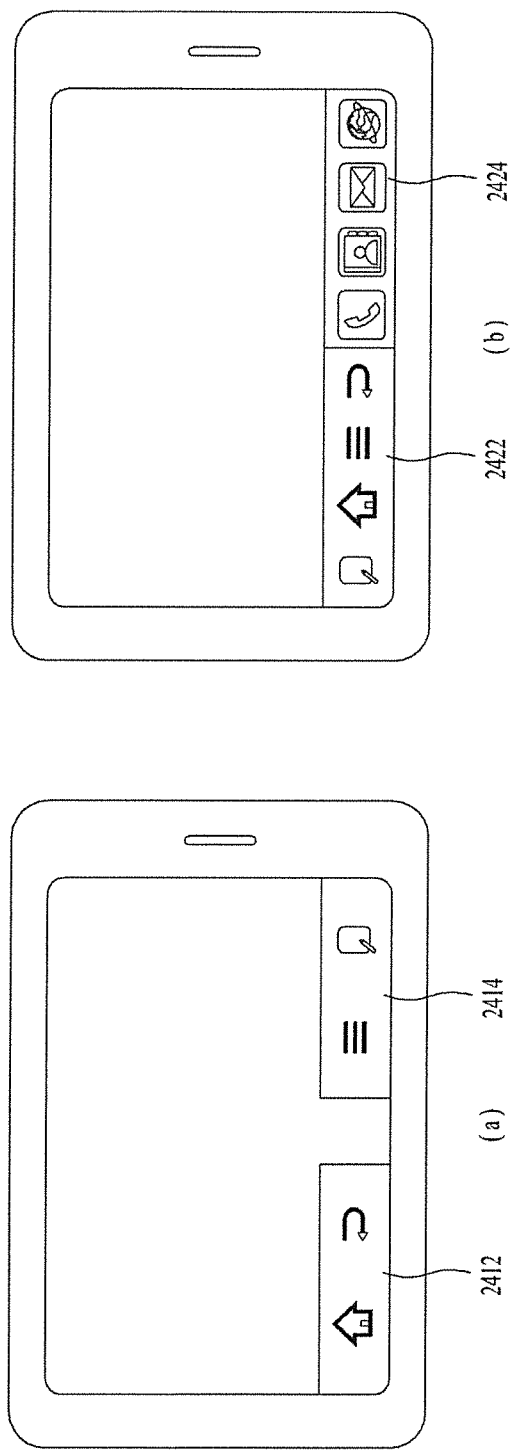

FIG. 24 and FIG. 25 are diagrams of examples of outputs to a display unit set in landscape mode, respectively. In particular, FIG. 24 is a diagram for one example of a case that a navigation region is configured on a bottom part of a display unit, while FIG. 25 is a diagram for one example of a case that a navigation region is configured on a right/left end of a display unit.

Referring to FIG. 24 (a), if a mode of a display unit is set to a landscape mode, a controller can display a navigation region in a manner of partitioning the navigation region into two regions 2412 and 2414. In particular, when the navigation region is partitioned into the two regions, the controller can control the two regions 2412 and 2414 to be displayed on left and right sides of the displayed unit, respectively. A user manipulates the left navigation region and the right navigation region with a left hand a right hand, respectively, thereby touching navigation buttons easily and conveniently.

Referring to FIG. 24 (b), the controller can arrange a navigation region 242 and a dock region 2424 in a straight line together. If the navigation region 2422 and the dock region 2424 are arranged in the straight line, a space occupied by the navigation region 2422 and the dock region 2424 can be minimized.

Referring to FIG. 25 (a) and FIG. 25 (b), if a mode of a display unit is set to a landscape mode, a controller can control a navigation region 2510 to be displayed on a right or left end of the display unit. Whether the navigation region 2510 will be displayed on the right or left end of the display unit can be manually adjusted by a user.

In case that the navigation region 2510 is configured on one of the right and left ends of the display unit, a dock region 2520 can be configured on the other. Hence, a user can manipulate the navigation region 2510 and the dock region 2520 using two hands, respectively.

In doing so, if the controller detects an inclination of the mobile terminal or the user commands a change of an output mode of the display unit, the controller can change the output mode of the display unit.

According to one embodiment of the present invention, the above-described method of changing a type and arrangement of a navigation key can be implemented in a program recorded medium as processor-readable codes. The processor-readable media include all kinds of recording devices in which data readable by a processor are stored. The processor-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

Accordingly, the present invention provides the following effects and/or features.

First of all, the present invention provides a mobile terminal capable of receiving a user input of a new type different from a type of the related art using soft keys.

Secondly, the present invention enables a user to determine a type and arrangement of a displayed navigation button of user's own.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
   a display configured to display information on a display screen; and
   a controller configured to:
      cause the display to display a list of candidate navigation buttons;
      cause the display to display a preview image in a preview region on the display screen, the preview image comprising navigation buttons selected from the list such that the selected navigation buttons, including a first navigation button and a second navigation button, are arranged in a first sequence;
      cause the display to display, in a navigation region on the display screen, navigation buttons corresponding to the selected navigation buttons in the first sequence;
      cause switching of the first navigation button and the second navigation button of the preview image in response to a touch input received at the preview image such that the selected navigation buttons of the preview image are rearranged in a second sequence; and
      cause the display to display the navigation buttons in the navigation region in the second sequence according to the selected navigation buttons of the preview image rearranged in the second sequence.

2. The mobile terminal of claim 1, wherein the controller is further configured to cause the display to display a setting menu for adjusting a transparency of the navigation region.

3. The mobile terminal of claim 1, wherein one of the navigation buttons in the navigation region represents an application button for executing a specific application executed most recently.

4. The mobile terminal of claim 3, wherein one of the navigation buttons represents a recent application button for displaying a list of recently executed applications.

5. The mobile terminal of claim 1, wherein:
   the controller is further configured to cause the display to display a pair of arrow buttons for controlling a position of a cursor or selecting displayed text in a text input mode; and
   one of the pair of arrow buttons is displayed at a left side of the navigation region and the other one of the pair of arrow buttons is displayed at a right side of the navigation region.

6. The mobile terminal of claim 5, wherein if a predetermined navigation button in the navigation region is touched, the controller is further configured to cause the display to further display a plurality of buttons.

7. The mobile terminal of claim 1, wherein if a touch input touching one of the navigation buttons in the navigation region is received for a threshold duration, the controller is further configured to cause the touched navigation button to be temporarily changed to another navigation button in the navigation region.

8. The mobile terminal of claim 1, wherein the navigation buttons comprise at least one of a home button for shifting to a home screen that is displayed initially upon activation of the mobile terminal and a cancel button for cancelling a user command that is input.

9. The mobile terminal of claim 1, wherein if the mobile terminal is gripped by a left hand of a user, the controller is further configured to cause the navigation buttons to be displayed on a left side portion of the display screen, and if the mobile terminal is gripped by a right hand of the user, the controller is further configured to cause the navigation buttons to be displayed on a right side portion of the display screen.

10. The mobile terminal of claim 1, wherein if the displaying of the navigation region is stopped such that the navigation region is no longer displayed on the display screen, the controller is further configured to cause the display to temporarily resume displaying of the navigation region in response to a touch input received via the display screen while the displaying of the navigation region is stopped.

11. The mobile terminal of claim 1, wherein the controller is further configured to:
   cause the display to divide the display screen into a first region on which a first application is displayed and a second region on which a second application is displayed; and
   control an action caused by manipulating one of the navigation buttons to be applied to one of the first region and the second region,
   wherein the navigation buttons in the navigation region is available to be used for both the first application and the second application, and
   wherein when one of the first region and the second region is selected by a touch input, the controller is further configured to control the action to be applied to only the selected one of the first region and the second region.

12. The mobile terminal of claim 11, wherein the navigation region is used as a boundary for dividing the first region and the second region.

13. The mobile terminal of claim 1, wherein the controller is further configured to:
   cause a first action to be performed if a first touch input is applied to a specific navigation button in the navigation region; and
   cause a second action to be performed if a second touch input is applied to the specific navigation button in the navigation region.

14. The mobile terminal of claim 1, wherein if a display mode of the mobile terminal is changed from a portrait mode to a landscape mode, the controller is further configured to cause the display to:
   partition the navigation region into two parts; and then
   display one part of the navigation region on a left side portion of the display screen, and display the other part of the navigation region on a right side portion of the display screen.

15. The mobile terminal of claim 1, wherein the controller is further configured to cause the display to further display a dock region comprising dock icons instead of the navigation region comprising the navigation buttons in response to a user input.

16. The mobile terminal of claim 15, wherein the controller is further configured to cause the display to display a toggle key for switching the navigation region to the dock region.

17. The mobile terminal of claim 15, wherein the controller is further configured to:
cause the display to display both the navigation region comprising the navigation buttons and the dock region comprising the dock icons simultaneously; and
set one of the navigation buttons and the dock icons as a main button and set the other one of the navigation buttons and the dock icons as a sub button.

18. The mobile terminal of claim 17, wherein the controller is further configured to:
if a first touch input is received on a pair of a specific navigation button and a specific dock icon, perform a first function assigned to the main button of the pair; and
if a second touch input is received on the pair of the specific navigation button and the specific dock icon, perform a second function assigned to the sub button of the pair.

19. The mobile terminal of claim 1, wherein the controller is further configured to:
cause the display to display the navigation region comprising the navigation buttons and a dock region comprising dock icons at least partially overlapping, in different sizes, or in close proximity to each other when the mobile terminal is in a portrait orientation; and
cause the display to display the navigation region and the dock region individually in a substantially same size in a single line format at a bottom end portion of the display screen such that a first group of the navigation buttons is displayed at a first side portion of the display screen and a second group of the dock icons is displayed at a second side portion of the display screen when the mobile terminal is in a landscape orientation.

20. The mobile terminal of claim 1, wherein the controller is further configured to cause the display to display the navigation region comprising the navigation buttons on one side portion of the display screen and to display a dock region comprising dock icons on the other side portion of the display screen when the mobile terminal is in a landscape orientation.

21. The mobile terminal of claim 1, wherein the controller is further configured to cause the display to:
display an object for displaying the navigation buttons; and
display the navigation buttons in response to a touch input touching the object.

22. The mobile terminal of claim 21, wherein the object is movable on the display screen following a drag input dragging the object.

23. The mobile terminal of claim 1, wherein the controller is further configured to:
cause the display to simultaneously display the list of candidate navigation buttons and the preview region on the display screen; and
insert a specific candidate navigation button into the navigation region in response to a drag input dragging the specific candidate navigation button from the list to the preview region.

24. The mobile terminal of claim 1, wherein the list, the preview image in the preview region, and the navigation buttons in the navigation region are displayed together on the display screen.

* * * * *